US012639708B2

(12) United States Patent     (10) Patent No.:    US 12,639,708 B2

De Brouwer et al.          (45) Date of Patent:    *May 26, 2026

---

(54) PROVENANCE FOR AI TWIN OF AN ARTIST

(71) Applicant: Sound Patrol Inc., Los Angeles, CA (US)

(72) Inventors: Walter Adolf De Brouwer, Malibu, CA (US); Tamay Aykut, Pacifica, CA (US)

(73) Assignee: Sound Patrol Inc., Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/263,395

(22) Filed: Jul. 8, 2025

(65) Prior Publication Data

US 2025/0335910 A1     Oct. 30, 2025

Related U.S. Application Data

(63) Continuation of application No. 18/142,743, filed on May 3, 2023, now Pat. No. 12,354,198.

(Continued)

(51) Int. Cl.
    *G06Q 20/38*       (2012.01)
    *G06F 21/16*       (2013.01)
    (Continued)

(52) U.S. Cl.
    CPC ........... *G06Q 20/389* (2013.01); *G06F 21/16* (2013.01); *G06N 3/084* (2013.01); *G06Q 20/363* (2013.01);
    (Continued)

(58) Field of Classification Search
    CPC ...... G06Q 20/389; G06Q 50/184; G06N 3/08; G06N 20/00; G06N 5/022; G06N 3/084;
    (Continued)

(56) References Cited

U.S. PATENT DOCUMENTS

| | | |
|---|---|---|
| 11,275,841 B2 | 3/2022 | Poliakov |
| 11,367,060 B1 | 6/2022 | Barbashin et al. |

(Continued)

OTHER PUBLICATIONS

Bashayreh, Mohammad, Fadi N. Sibai, and Amer Tabbara. "Artificial intelligence and legal liability: towards an internationalu approach of proportional liability based on risk sharing." Information & Communications Technology Law 30.2 (2021): 169-192. (Year: 2021) 24 pages.

(Continued)

*Primary Examiner* — Hosuk Song
(74) *Attorney, Agent, or Firm* — FP; Sikander M. Khan

(57) ABSTRACT

The technology disclosed relates to a provenance system for tracing licensing of targeted artificial intelligence (AI) systems. A training logic is configured to train an AI system on a training dataset that satisfies a target artist configuration by requiring that at least some training samples in the training dataset are sourced from a target artist, and to generate a trained version of the AI system (trained AI system). The trained AI system is configured to construct an output that satisfies that target artist configuration. A provenance logic is configured to provide access to the trained AI system, and to validate that new outputs generated by repurposing the trained AI system satisfy the target artist configuration. The provenance logic comprises a creator's list, which is configured to authenticate new outputs generated by the trained version of the artificial intelligence system.

20 Claims, 17 Drawing Sheets

Related U.S. Application Data

(60) Provisional application No. 63/337,988, filed on May 3, 2022.

(51) Int. Cl.
| | |
|---|---|
| *G06N 3/084* | (2023.01) |
| *G06Q 20/36* | (2012.01) |
| *G06Q 50/18* | (2012.01) |
| *G06T 13/40* | (2011.01) |
| *G06T 15/00* | (2011.01) |

(52) U.S. Cl.
CPC ........... *G06Q 50/184* (2013.01); *G06T 13/40* (2013.01); *G06T 15/005* (2013.01); *G06Q 2220/18* (2013.01)

(58) Field of Classification Search
CPC ........ G06F 21/16; G06F 21/577; G06F 21/64; G06T 13/40; H04L 9/50
See application file for complete search history.

(56) References Cited

U.S. PATENT DOCUMENTS

| | | | |
|---|---|---|---|
| 11,436,019 | B2 | 9/2022 | Pudipeddi et al. |
| 11,481,815 | B1 | 10/2022 | Aviv et al. |
| 11,627,344 | B2 * | 4/2023 | Shore ................. H04N 21/2743 |
| | | | 709/231 |
| 11,681,918 | B2 | 6/2023 | Goswami et al. |
| 11,842,287 | B1 | 12/2023 | Rosenoer |
| 11,961,233 | B2 | 4/2024 | Liu |
| 11,991,299 | B1 | 5/2024 | Rosenoer |
| 12,254,453 | B2 * | 3/2025 | Chiu ................. G06Q 20/3821 |
| 12,285,673 | B2 * | 4/2025 | Martin ..................... G06T 7/20 |
| 12,307,159 | B2 * | 5/2025 | Moro ..................... G06F 3/165 |
| 12,354,198 | B2 * | 7/2025 | De Brouwer ........ G06Q 20/363 |
| 12,380,418 | B2 * | 8/2025 | Cella ................. G06Q 10/0633 |
| 12,386,804 | B2 * | 8/2025 | Cruz Morales ..... G06F 21/6218 |
| 12,394,333 | B2 * | 8/2025 | Trivedi ................. G09B 19/06 |
| 2023/0315877 | A1 | 10/2023 | McMillon et al. |
| 2023/0316075 | A1 | 10/2023 | Cella et al. |

OTHER PUBLICATIONS

John Thickstun et al., "Learning Features of Music From Scratch", ICLR Apr. 6, 2017, 14 pages.
Miranda Christ et al., "Undetectable Watermarks for Language Models", arXiv:2306.09194v1 [cs.CR] May 25, 2023, 32 pages.
Rohith Kuditipudi et al., "Robust Distortion-free Watermarks for LanguageModels", Stanford Center for Research on Foundation Models, 2024, 10 pages.
Rohith Kuditipudi, "Robust Distortion-free Watermarks for Language Models", arXiv:2307.15593v3 [cs.LG] Jun. 6, 2024, 59 pages.

* cited by examiner

Provenance Wrapper 500

AI System
704

Weights Standard Deviation 714

Weights Mean 724

Conditions 712

Random Seed 734

Blockchain State 744

Creation State 754

Hash Generator
764

Datastore
114

Provenance Private Key 774

Blockchain 116

Conditions-Based
Private Key Generation 700

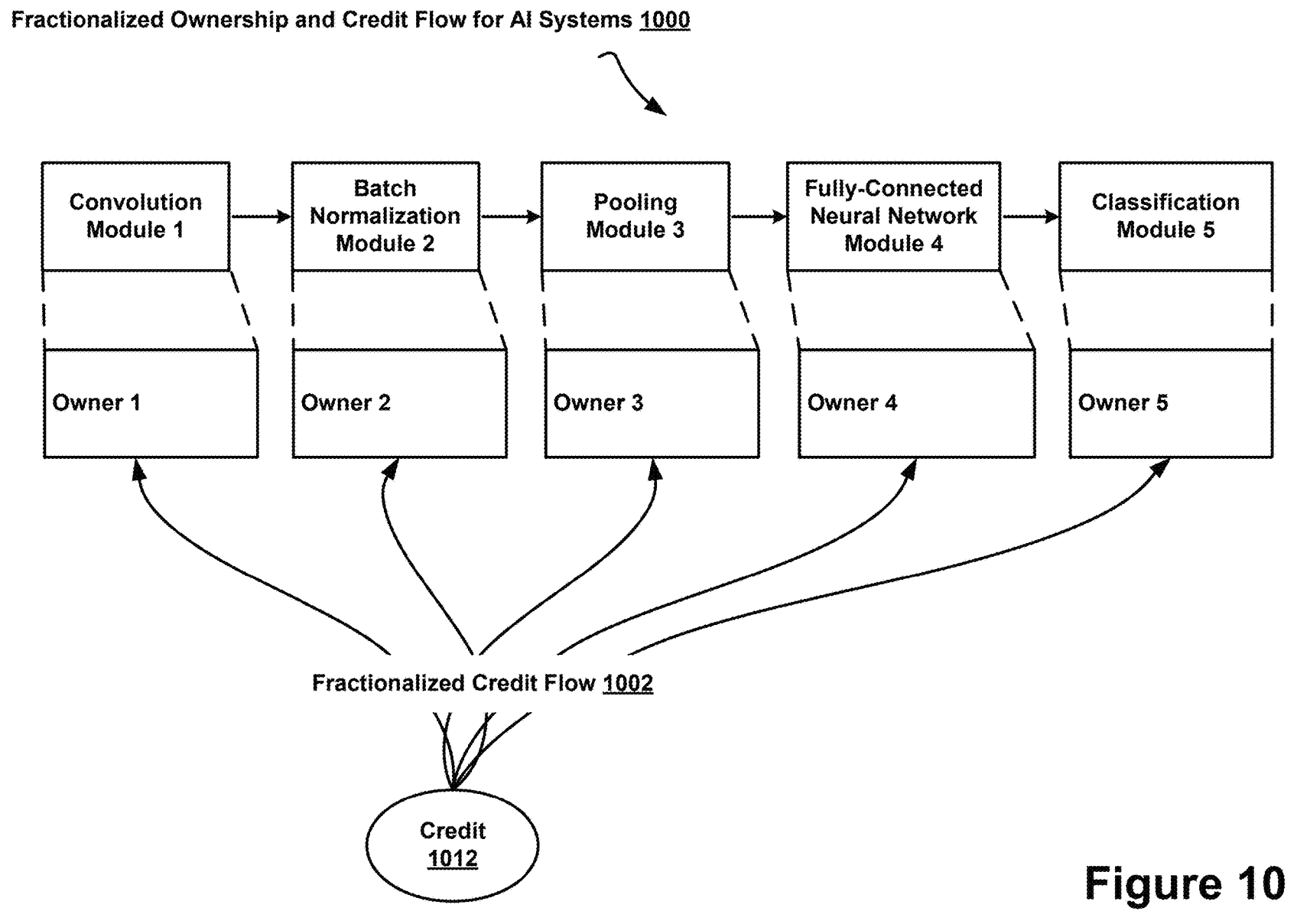

Fractionalized Ownership and Credit Flow for AI Systems 1000

Convolution Module 1

Batch Normalization Module 2

Pooling Module 3

Fully-Connected Neural Network Module 4

Classification Module 5

Owner 1

Owner 2

Owner 3

Owner 4

Owner 5

Fractionalized Credit Flow 1002

Credit 1012

Figure 10

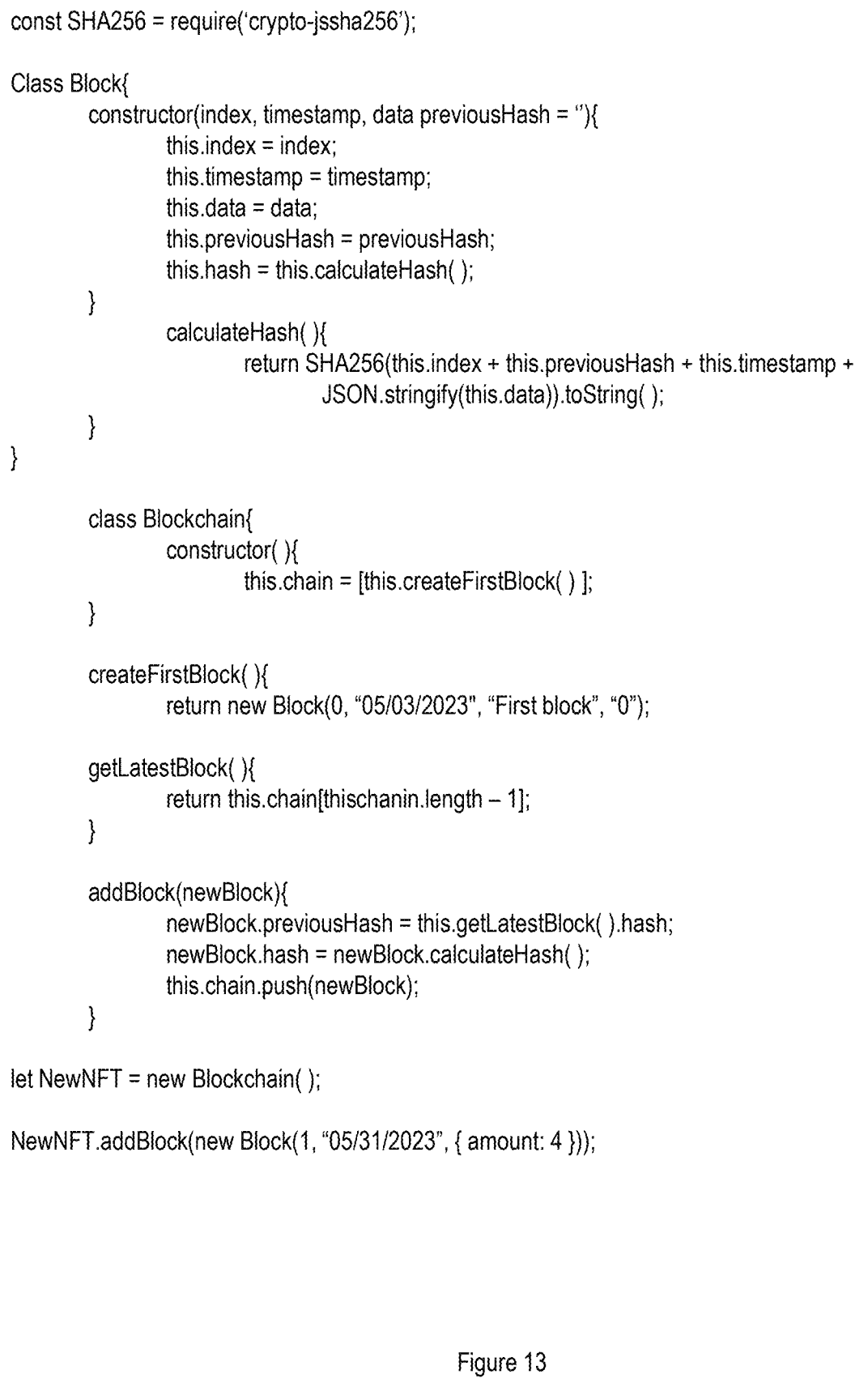

```
const SHA256 = require('crypto-jssha256');

Class Block{
        constructor(index, timestamp, data previousHash = ''){
                this.index = index;
                this.timestamp = timestamp;
                this.data = data;
                this.previousHash = previousHash;
                this.hash = this.calculateHash( );
        } calculateHash( ){
                        return SHA256(this.index + this.previousHash + this.timestamp +
                                JSON.stringify(this.data)).toString( );
                }
} class Blockchain{
                constructor( ){
                        this.chain = [this.createFirstBlock( ) ];
                } createFirstBlock( ){
                return new Block(0, "05/03/2023", "First block", "0");

getLatestBlock( ){
                return this.chain[thischanin.length – 1];
        } addBlock(newBlock){
                newBlock.previousHash = this.getLatestBlock( ).hash;
                newBlock.hash = newBlock.calculateHash( );
                this.chain.push(newBlock);
        } let NewNFT = new Blockchain( );

NewNFT.addBlock(new Block(1, "05/31/2023", { amount: 4 }));
```

Figure 13

Figure 14:
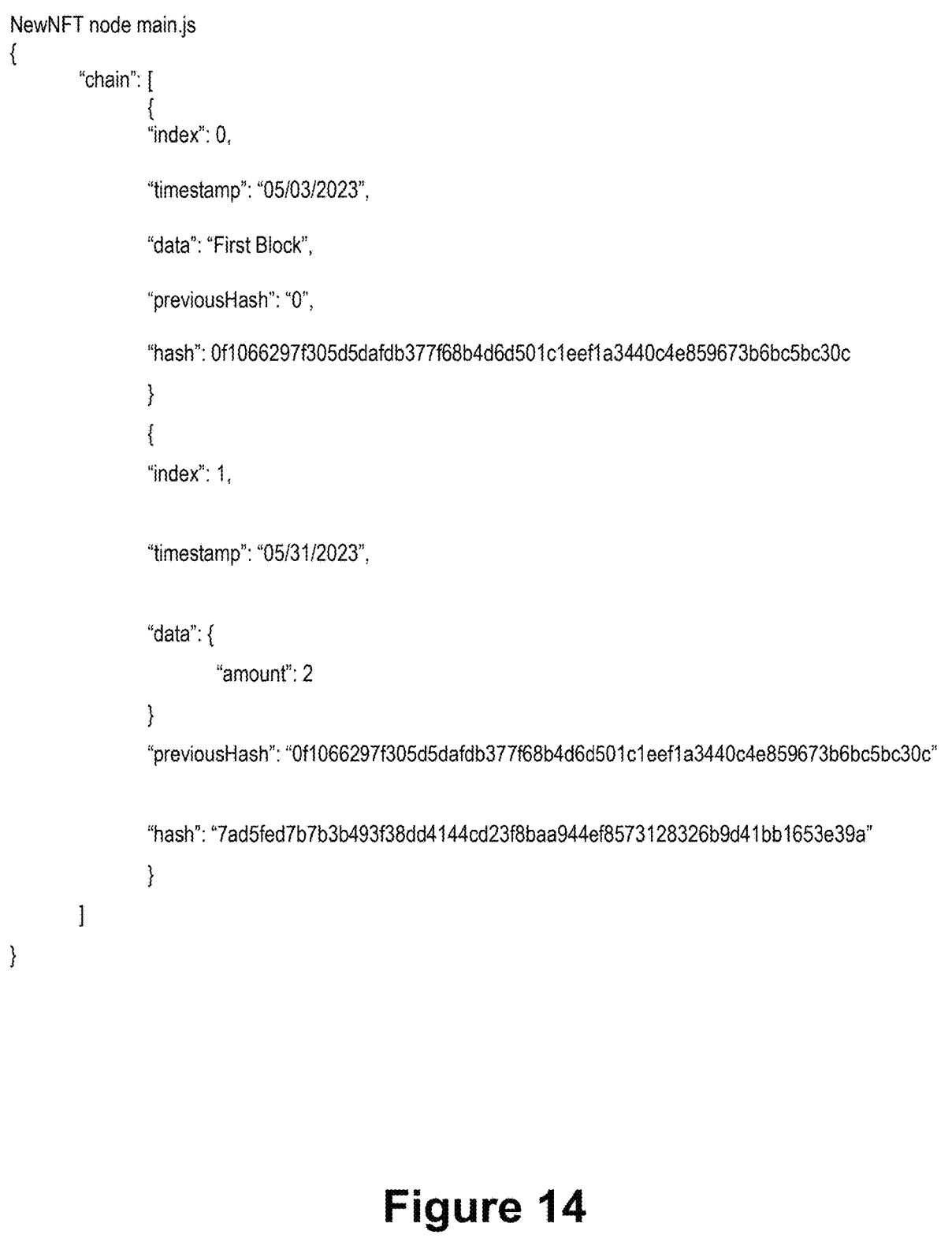

```
NewNFT node main.js
{
        "chain": [
                {
                "index": 0, "timestamp": "05/03/2023", "data": "First Block", "previousHash": "0", "hash": 0f1066297f305d5dafdb377f68b4d6d501c1eef1a3440c4e859673b6bc5bc30c }
                {
                "index": 1, "timestamp": "05/31/2023", "data": {

"amount": 2

}
                "previousHash": "0f1066297f305d5dafdb377f68b4d6d501c1eef1a3440c4e859673b6bc5bc30c"

"hash": "7ad5fed7b7b3b493f38dd4144cd23f8baa944ef8573128326b9d41bb1653e39a"

```
isChainValid( ){ for (let I = 1; I < this.chain.length; i++){ const currentBlock = thischain[i];

const previousBlock = this.chain[I – 1];

if (currentBlock.hash !== currentBlock.calculateHash( ) ) { return false;

if (currentBlock.previousHash !== previousBlock.hash){ return false;
                }

} return true;

```
Struct MarketItem {
        uint id;
        address NFTcontract;
        uint256 TokenId;
        address payable seller;
        address payable buyer;
        uint256 price;
        State state;
}

Enum State { Created, Released, Inactive }

Mapping (unint256 => MarketItem) private marketItems;

Function createMarketItem(
        address NFTcontract,
        uint256 TokenId,
        uint256 price
) public payable nonReentrant {
        require(price > 0, "price must be at least 1 unit");
        _itemCounter.increment();
        uint256id = _itemCounter.current( );

marketItems[id] = MarketItem(
                id,
                NFTcontract,
                TokenId,
                payable(msg.sender),
                payable(address(0)),
                price,
                State.Created
        );

Require(
        IERC721(NFTcontract).getApproved(TokenId) == address(this)
        );
```

Figure 16

```
const wrapTxn = await NFT.wrap(
        tokenId,
                amount, // 1 for 721-NFTs
        standard,
        (response) : any => {
           // On success
           console.log('Successful', response);

// Retrieve wrapped NFT address
           const wrappedAddress = response.args.wrappedAddress;
           console.log('Wrapped address', wrappedAddress);
        },
        (error) : any => {
           // On error
           console.log('Failed', error);
        });
```

Figure 17

PROVENANCE FOR AI TWIN OF AN ARTIST

PRIORITY APPLICATION

This application is a continuation of U.S. Non-Provisional application Ser. No. 18/142,743, filed on May 3, 2023, which claims the benefit of and priority to U.S. Provisional Patent Application No. 63/337,988, filed May 3, 2022, all of which are incorporated herein by reference in their entirety and for all purposes as if completely and fully set forth herein.

FIELD OF THE TECHNOLOGY DISCLOSED

The technology disclosed relates to artificial intelligence type computers and digital data processing systems and corresponding data processing methods and products for emulation of intelligence (i.e., knowledge-based systems, reasoning systems, and knowledge acquisition systems); and including systems for reasoning with uncertainty (e.g., fuzzy logic systems), adaptive systems, machine learning systems, and artificial neural networks. In particular, the technology disclosed relates to a provenance protocol wrapper for non-fungible token (NFT) platforms.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

Artificial intelligence (AI) systems can generate many kinds of digital multimedia, including text (such as stories or poems), graphics (such as pictures, photographs, icons, faces, etc.), animations (such as two-dimensional or three-dimensional motion graphics), video (such as movies or clips) and sound (such as music, noises, ring bells, etc.) as if they were generated by humans, with little or without human intervention.

Blockchain technology is an innovative technology for organizing data in a secured manner. More specifically, a blockchain is a distributed ledger that can record transactions between two computer systems efficiently and in a verifiable and permanent way. A typical blockchain is a growing list of records, referred to as blocks, that are linked using cryptography. A blockchain database is typically managed autonomously using a peer-to-peer network and a distributed timestamping server. In many decentralized blockchains, every node in the decentralized system has a copy of the blockchain. Transactions are broadcast over the computer network and data quality is maintained by database replication and computational trust.

Many blockchains are publicly accessible and are referred to as permissionless. In a permissionless blockchain, any computing system can choose to run a node for the blockchain and participate in transaction verifications via a mining mechanism, as well as create smart contracts on the network. In these frameworks, network participants are rewarded for their contributions through the issuance of cryptographic tokens or cryptocurrency.

On the other hand, a permissioned blockchain is a closed computing system in which each participant is well-defined. This type of blockchain is built to allow an organization or a consortium of organizations to efficiently exchange information and record transactions. In a permissioned blockchain, only pre-approved entities can run the nodes that validate transaction blocks and execute smart contracts on the blockchain.

In both permissioned and permissionless blockchains, smart contracts or software programs can run on the blockchain. A smart contract enforces a set of rules using cryptographic code. Smart contracts are usually developed as high-level programming abstractions that can be compiled down to bytecode, which can be deployed to a blockchain for execution by computer systems using a virtual machine deployed in conjunction with the blockchain. Once a smart contract is called within a blockchain, the code of the smart contract acts as a programmatically defined autonomous agent with its own persistent variables that executes by computer systems within the blockchain when the smart contract is referenced by a message and/or transaction. The output of the smart contract (such as updated wallet balance, update of information, etc.) is then written to the blockchain for permanent recording.

As such, blockchains are a natural choice for provenance management of AI-generated multimedia. An AI process that generates multimedia can be coded into a smart contract and the provenance can be recorded in the blockchain. The generated multimedia become cryptographic tokens that the ownership is associated with them as provenances. Cryptographic tokens or non-fungible tokens (NFTs) are created with respect to the AI-generated multimedia and can be used to transfer the AI-generated multimedia via smart contracts. If the two processes, the creation of multimedia and the recording of associated provenance, are integrated within a blockchain system, it helps securely verify the origin of the multimedia, which supports the evidence of provenance issuance and make it possible to exchange the provenance in a trusted manner. Once separated, there will appear numerous limitations.

First of all, once the creation happens outside of the blockchain system (i.e., not via the specific smart contract of the blockchain, or not via a compatible smart contract to the blockchain), there cannot be any record to verify its origin (who and when and how). If the origin of the multimedia cannot be justified, its associated provenance is meaningless. Conventional NFT platforms are limited by this origin verification.

Secondly, when a digital multimedia is generated, it is not only the one who uses the tool to create it, but it is necessary to recognize the contribution of the programmer who created the tool, the provider who made the tool available. All involved people should be considered to be related to the creation and should be able to receive royalties from any profit of the exchanging of the multimedia that can arise.

Furthermore, from a technical viewpoint, blockchain enterprise applications are difficult to implement since they require knowledge of cryptography, peer-to-peer systems, and specialized languages used in blockchain smart contracts. Other technical issues associated with blockchains include interfacing an application on the blockchain with already existing technologies, such as reporting services and databases.

Thus, a need exists for a method in which the blockchain is equipped with the functionalities from AI to be able to become both a validator and an executor of the data that it will preserve. Moreover, a need exists for a system and a method for the creation and the exchange of provenance for each AI-generated multimedia via a blockchain.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings, in which.

FIG. 10 illustrates one implementation of the disclosed NFT platform establishing fractional ownership of AI systems and fractionalized credit flow to the fractional owners of credit resulting from the repurposing of the AI systems.

FIG. 13 shows an example of simplified JavaScript code defining a blockchain that can be used to implement a portion of the disclosed NFT platform.

FIG. 14 shows an example of JavaScript code to create a blockchain that can be used to implement a portion of the disclosed NFT platform.

FIG. 15 shows an example of JavaScript code to determine the validity (e.g., provenance) of a blockchain in the disclosed NFT platform.

FIG. 16 shows an example of JavaScript code of a smart contract that may be used in the disclosed NFT platform.

FIG. 17 shows an example of pseudo code of wrapping that may be used in the disclosed NFT platform.

DETAILED DESCRIPTION

Figure 1:
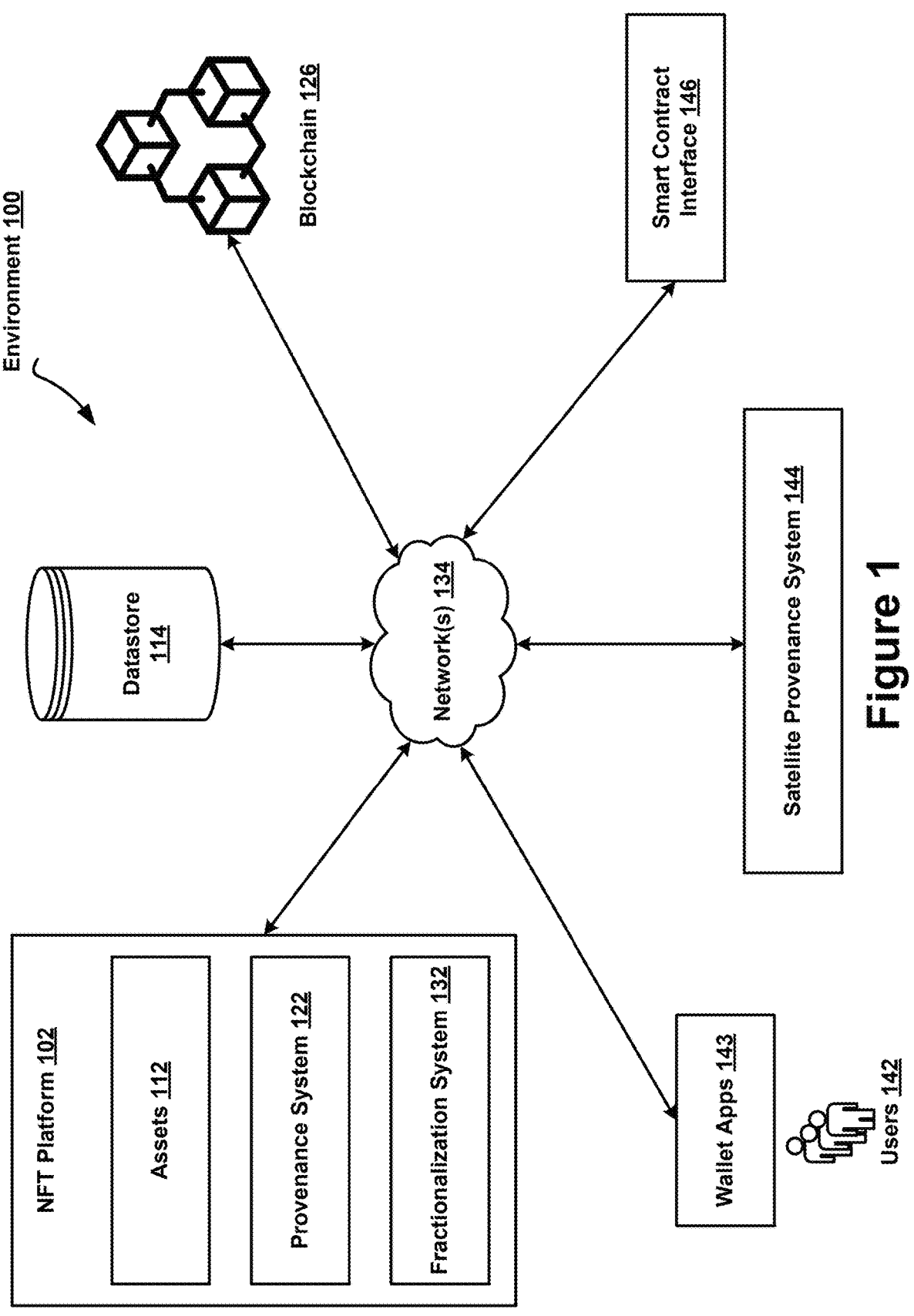
FIG. 1 illustrates one implementation of an environment in which the disclosed non-fungible token (NFT) platform operates.

The following discussion is presented to enable any person skilled in the art to make and use the technology disclosed and is provided in the context of a particular application and its requirements. Various modifications to the disclosed implementations will be readily apparent to those skilled in the art, and the general principles defined herein can be applied to other implementations and applications without departing from the spirit and scope of the technology disclosed. Thus, the technology disclosed is not intended to be limited to the implementations shown but is to be accorded the widest scope consistent with the principles and features disclosed herein.

The detailed description of various implementations will be better understood when read in conjunction with the appended drawings. To the extent that the figures illustrate diagrams of the functional blocks of the various implementations, the functional blocks are not necessarily indicative of the division between hardware circuitry. Thus, for example, one or more of the functional blocks (e.g., modules, processors, or memories) can be implemented in a single piece of hardware (e.g., a general-purpose signal processor or a block of random access memory, hard disk, or the like) or multiple pieces of hardware. Similarly, the programs can be stand-alone programs, can be incorporated as subroutines in an operating system, can be functions in an installed software package, and the like. It should be understood that the various implementations are not limited to the arrangements and instrumentality shown in the drawings.

The processing engines and databases of the figures, designated as modules, can be implemented in hardware or software, and need not be divided up in precisely the same blocks as shown in the figures. Some of the modules can also be implemented on different processors, computers, or servers, or spread among a number of different processors, computers, or servers. In addition, it will be appreciated that some of the modules can be combined, operated in parallel or in a different sequence than that shown in the figures without affecting the functions achieved. The modules in the figures can also be thought of as flowchart steps in a method. A module also need not necessarily have all its code disposed contiguously in memory; some parts of the code can be separated from other parts of the code with code from other modules or other functions disposed in between.

The discussion is organized as follows. First, an introduction describing some of the technical limitations of provenance as implemented by existing NFT platforms is presented, followed by an overview of the technical improvements offered by the disclosed NFT platform (also referred to herein as "the Snowcrash Platform"). Then, a high-level description of the environment in which the disclosed NFT platform operates is discussed at an architectural level. Next, the algorithms and interfaces used by some implementations to trace the repurposing of artificial intelligence (AI) systems using provenance private keys are discussed. Advancing further, fractionalized ownership and credit flow of AI systems are covered. Lastly, more detailed implementations of the disclosed NFT platform are discussed as clauses.

INTRODUCTION

A non-fungible token (NFT) is a unit of data stored on a blockchain that certifies a digital asset to be unique and therefore not interchangeable while offering a non-duplicable digital certificate of ownership for the NFT. The NFT establishes the provenance of the digital asset, offering indisputable answers to questions like who owns, previously owned, and created the NFT, as well as which of the many copies of the digital asset is the original. Several digital objects can be associated with an NFT, including photos, videos, audio, and other types of digital files. NFTs can also be used to commodify digital objects in different contexts, such as art, gaming, and sport collectibles.

Original NFT pieces ultimately arise from a single creator's blockchain address. Every single transfer from creator to owner leaves a permanent record on the blockchain. The digital assets are effectively tokenized and contain data to track their source of origin and their transfers. Being tokenized means every NFT has a token ID within a collection. The token ID is used to track the movements of the NFT and thereby the collection. The token ID and the NFT can link to the so-called InterPlanetary File System (IPFS), a protocol and peer-to-peer network for storing and sharing data in a distributed file system.

Even though blockchain technology allows for seamless tracking of an asset, there is still plenty of room for fraud. Some hackers, unable to alter the blockchains themselves, have found ways to manipulate them. One method of doing this is called sleepminting. Sleepminting allows hackers to mint an original piece from an artist's crypto wallet, and then transfer that piece back to the hacker's wallet. The transactions are legitimate on the blockchain as if the artist had approved the transaction. It is almost undetectable. Consider the case study of sleepminting involving Beeple's "the first 500 days." Shortly after "the first 500 Days" sold for $69 million at a Christie's auction, a hacker/prankster known as Monsieur Personne sleepminted the piece. He returned it to his wallet and listed it for sale for 0.25 ETH on Rarible. An exact copy of "the first 500 Days" even appeared as Rarible-verified (!), with a black and yellow check beneath the Creator heading. Hence, to spot a sleepminted piece from an original, one must check if both the mint transaction's sender and the NFT's sender match Beeple's correct address. If not, it is a fake.

Therefore, an opportunity arises to improve the provenance of digital assets on NFT platforms. Increased user trust and engagement can result.

The disclosed non-fungible token (NFT) platform establishes NFT-based provenance of digital assets by coupling NFTs with so-called provenance private keys. The provenance private keys establish the provenance of the digital assets by opening a provenance vault, which is included in the NFTs of the disclosed NFT platform. The provenance private keys can be reconstructed prior to the acquisition of the digital assets using metadata information of the NFTs, e.g., transaction hashes of the NFTs.

The provenance private keys are generated when a digital asset is created. Subsequently, the provenance private keys are permanently linked to the digital asset for downstream provenance. In one implementation, the provenance private keys are generated during inference of artificial intelligence (AI) systems, and, in other implementations, the provenance private keys are generated during training of the AI systems.

The disclosed NFT platform can also establish provenance of digital assets using so-called decentralized autonomous organizations (DAOs). Multiple entities associated with the digital assets, e.g., content creators/artists, the disclosed NFT platform, and content publishers, can establish a DAO on the blockchain. A transaction hash of the DAO can be used as a provenance private key to open a provenance vault wrapped with NFTs of the DAO's digital assets.

The disclosed NFT platform also enables fractionalized ownership and credit flow of credit resulting from repurposing AI systems. The ownership and credit distribution can be fractionalized at different architectural resolutions/ granularities of the AI systems, ranging from per-layer, per-node in a layer, and so on.

Blockchains

As described herein, the term "blockchain" refers to a distributed database that maintains a continuously growing ledger or list of records, called "blocks," secured from tampering and revision using hashes. Every time data is published to a blockchain database, the data can be published as a new block. Each block can include a timestamp and a link to a previous block. Through the use of a peer-to-peer network and a distributed timestamping server, a blockchain database is managed autonomously.

Permissionless blockchains are open, distributed ledgers that can record transactions between two parties efficiently and in a verifiable and permanent way. It should be appreciated that permissioned blockchains are also targeted with this present invention. Consensus ensures that the shared ledgers are exact copies, which lowers the risk of fraudulent transactions. Cryptographic hashes, such as the SHA256 computational algorithm, ensure that any alteration to transaction input results in a different hash value being computed, which indicates a potentially compromised transaction input. Digital signatures ensure that transactions originated from senders (signed with private keys) and not imposters. This covers different approaches to processing, including hash trees and hash graphs. At its core, a blockchain system records the chronological order of transactions with all nodes agreeing to the validity of transactions using the chosen consensus model. As a result, transactions are irreversible and agreed to by all members of the network.

An example of a blockchain is a cryptocurrency. The cryptocurrency is generated when new blocks are created on the blockchain to confirm transactions of the cryptocurrency. The new blocks can confirm the transfer of cryptocurrency generated in earlier blocks. The blocks on the blockchains are cryptographically proofed and linked to earlier blocks and served as an immutable record of the events in a trustless decentralized peer-to-peer network.

For example, a cryptocurrency (e.g., Bitcoin) is represented as a chain of events that transfers ownership from one party to another party on a blockchain without an intermediary. Each event transferring ownership from one party to another is cryptographically proofed by including the public key of the new owner. Further, each event is digitally signed with the current owner's private key.

A new block in a blockchain is filled with cryptographically proofed events until the block reaches a specified size limit. A hash digest of all the event identifiers within the block and the block header of the previous block is added as the first event in the block. Each block of events can be secured by a race between participants on a peer-to-peer network. In order to win the race, the participants collect new events to create the new block, validate the events on the new block by verifying the cryptographic proofs of each event to verify the cryptocurrency was not spent earlier, and solve a mathematical puzzle based on the hash digest, previous block header, and a random number. Blockchain provides a mathematical hierarchy of verifiable events that is immutable and is verified at each stage by the race between the participants.

Smart Contracts

The principles used in blockchains can be modified to allow for the execution of smart contracts deployed on the blockchain. As defined herein, "smart contracts" are self-executing machine-readable instructions that store state information and are stored on the blockchain. When deployed, the smart contract is assigned a unique address to allow communication to and from the smart contract through messages. The smart contract is deployed by storing the smart contract as an event on the blockchain (e.g., Ethereum™ blockchain). Messages to the smart contract can be posted as events on the blockchain. The smart contract can contain machine-readable instructions and data designed to execute on virtual machines.

Further, the smart contract can have the ability to read or write to its internal storage storing data, read the storage of a received message, and/or, send messages to other smart contracts to trigger the execution of the code in other distributed applications. When the smart contract is executed on a virtual machine running on the peers securing the blockchain, the resulting data can be saved in the internal storage of the smart contract. The updated smart contract can be stored as an event on a new block. Thus, the smart contract and changes to data are represented as a series of events on the blockchain.

For example, in a smart contract that governs a sale of an electronic asset, the smart contract can include machine-readable instructions to access its internal storage, read the storage of a message sent to the smart contract, and process the data in a received message, such as a counter-offer from a buyer. When the buyer sends a counter-offer to the smart contract, the smart contract can update its internal storage to include the counter-offer event, such as the identity of the buyer. The updated smart contract can be recorded as an event (e.g., a transaction) on a new block on the blockchain. As such, the blockchain stores the changes in the state of the smart contract as a series of events (e.g., a transaction).

Cryptographic Digital Assets

As explained, the smart contract governs a sale of an electronic asset, a "cryptographic digital asset," or a "digital asset," which refers to any computer-generated virtual object, including digital apparel, avatars, pets, art, etc., that have a unique, non-fungible tokenized code ("NFT") registered on and validated by a blockchain platform or registered in an immutable database. Specifically, NFTs describe blockchain-based cryptographic tokens that are created with respect to a specific piece of content, which incorporate programmatically defined digital rights management. The metadata associated with an NFT can also include digital media assets such as, but not limited to, images, videos about the specific NFT, or the context in which it was created (studio, film, band, company song, etc.). In a number of implementations, content creators can issue NFTs to users within the platform.

NFTs are created when blockchains string records of cryptographic hash onto previous records, thereby creating a chain of identifiable data blocks. This cryptographic transaction process ensures the authentication of each digital file by providing a digital signature that is used to track NFT ownership. An NFT stores the hash value of a piece of digital information in the personal wallet of the owner. In its simplest form, the related blockchain has two possible types of entries: (1) signature 'Alice' owns some unknown document D with hash value x; and (2) signature 'Alice' transfers ownership of hash value x to signature 'Bob.' Bob just needs to provide its public signature.

In many instances, each NFT has a unique serial number and the NFT smart contract defines an interface that enables the NFT to be managed, owned, and/or traded. Standards for defining interfaces for building NFTs on the Ethereum™ blockchain include ERC-721 and/or ERC-1155, among others, the disclosures of which are incorporated by reference in their entirety. NFTs can be contrasted with interchangeable or fungible tokens (e.g., Ether). Fungible tokens can be implemented on the Ethereum™ blockchain based upon standard interfaces, such as the ERC-20 standard, the disclosure of which is incorporated by reference in its entirety.

In a number of implementations, the smart contracts defining NFTs that can be minted within platforms specify fee distribution obligations with respect to specific types of transactions involving NFTs. In several implementations, the sale of an NFT within a platform can result in one or more residual royalty payment transactions that are recorded in the blockchain, such as a residual royalty payment to the content creator that minted the NFT, an AI programmer, and/or an AI API provider.

In some examples, the authenticity of a particular NFT can be verified independently of the content creator by auditing transaction records associated with the NFT within the blockchain to confirm consistency with the smart contract underlying the NFT. For example, the presence of transactions reflecting residual royalty payments that a smart contract indicates should have occurred upon transfers of the NFT can be relied upon to verify the authenticity of the NFT. Moreover, in implementations, "wallet applications" enable users to securely store NFTs and/or other tokens on their devices.

The NFT Platform

FIG. 1 illustrates one implementation of an environment 100 in which the disclosed non-fungible token (NFT) platform operates. Because FIG. 1 is an architectural diagram, certain details are intentionally omitted to improve the clarity of the description. The discussion of FIG. 1 is organized as follows. First, the elements of the figure are described, followed by their interconnections. Then, the use of the elements is described in greater detail.

The environment 100 includes the disclosed NFT platform 102, a datastore 114, and at least one blockchain network 126. The environment 100 also includes users 142 that can access the disclosed NFT platform 142 and the blockchain network 126 using wallet applications 143. The environment 100 also includes a smart contract interface 146 that can be used to create smart contracts for the disclosed NFT platform 102.

The blockchain network 126 comprises one or more nodes, which can be in communication with one or more servers, and/or one or more client devices. A node can be a server, a client device, or any other suitable networked computing platform. The blockchain network 126 can manage a distributed blockchain database that contains data recorded by the environment 100. This data can be maintained as a continuously growing ledger or listing, which can be referred to as blocks, secured from tampering and revision. Each block includes a timestamp and a link to a previous block.

In some implementations, through the use of a peer-to-peer blockchain network and a distributed timestamping server, a ledger blockchain database can be managed autonomously. Consensus ensures that the shared ledgers are exact copies and lowers the risk of fraudulent transactions. Cryptographic hashes are used to ensure that any alteration to transaction data input results in a different hash value being computed. Further, digital signatures ensure that data entry transactions (e.g., data added to the ledger blockchain database) originated from senders (signed with private keys). Further, the ledger blockchain database can record the chronological order of data entry transactions with one or more nodes agreeing to the validity of entry transactions using the chosen consensus model. The result is data entry transactions that are irreversible and agreed to by all members in the blockchain network 126.

The blockchain network 126 can comprise a cryptocurrency or digital asset designed to work as a medium of exchange that uses cryptography to: secure its transactions, control the creation of additional units, and verify the transfer of assets. Examples of cryptocurrencies include Bitcoin, Ethereum, Ripple, etc. The blockchain network 126 can also comprise tokens common to cryptocurrency-based blockchain networks.

Examples of popular blockchain platforms include Ethereum™, Eris™, Multichain™, Bitcoin™, Hyperledger Fabric™, and Hyperledger Corda™. The blockchain network 126 includes a distributed data structure comprising a chain of blocks. Blockchain acts as a distributed database or a public ledger that maintains records of all transactions on a peer-to-peer network. A blockchain is maintained by a network of nodes where every node executes and records the same transactions. The blockchain structure is replicated among the nodes in the network. Any node in the network can read the transactions. The transactions are time-stamped and bundled into blocks where each block is identified by its cryptographic hash called the nonce. The blocks form a linear sequence where each block references the hash of the previous or parent block, forming a chain of blocks called the blockchain. Each block maintains records of all the transactions on the network received since the creation of its previous block. Instead of storing the information on all the transactions within the block itself, a special data structure called a Merkle tree is used to store the transactions and only the hash of the root of the Merkle tree is stored in the block. New blocks are created and added to the blockchain in a process called mining. The nodes in the blockchain network 126 that perform the mining operations are called miners. New transactions are broadcast to all the nodes on the network. Each miner node creates its own block by collecting the new transactions and then finds a proof-of-work (PoW) for its block by performing complex cryptographic computations. The miners validate the transactions and reach a consensus on the block that should be added next to the blockchain. The newly mined block, called the winning block, is then broadcast to the entire network. The winning block is the one that contains a PoW of a given difficulty.

Blockchain is an immutable and durable data structure that maintains a record of the transactions that are tamper-resistant. Once a transaction is recorded in a block, it cannot be altered or deleted as long as a majority of the computational power of the network is not controlled by peers who collude to alter the blockchain. While each miner on the blockchain network 106 can create its own block, only the block which has a PoW of a given difficulty is accepted to be added to the blockchain. The consensus mechanism ensures that all the nodes agree on the same block to contain the canonical transactions. Blockchain offers enhanced security as compared to centralized systems as every transaction is verified by multiple miners. The integrity of the transaction data recorded in the blocks is protected through strong cryptography. In addition to the transaction data, each block contains a cryptographic hash of itself and the hash of the previous block. Any attempts to modify a transaction would result in a change in the hash and would require all the subsequent blocks to be recomputed. This would be extremely difficult to achieve as long as the majority of miners do not cooperate to attack the network.

The blockchain network 126 can host smart contracts. A smart contract is a piece of code that resides on blockchain and is identified by a unique address. A smart contract includes a set of executable functions and state variables. The function code is executed when transactions are sent to the functions. The transactions include input parameters that are required by the functions in the contract. Upon the execution of a function, the state variables in the contract change depending on the logic implemented in the function. Smart contracts can be written in various high-level languages (such as Solidity™ or Python™). Language-specific compilers for smart contracts (such as Solidity™ or Serpent™ compilers) are used to compile the contracts into bytecode. Once compiled, the contracts are uploaded to the blockchain network 106 which assigns a unique address to each contract.

One example of the wallet apps 143 is decentralized applications (DApps) that use smart contracts. DApps provide a user-friendly interface to smart contracts. A cryptocurrency application is an example of a DApp that runs on the blockchain network 126. A DApp comprises smart contracts and files for web user interface front-end (e.g., HTML, JavaScript, stylesheets, and images). In implementations, DApps also serve as machine interfaces directly accessible by devices, e.g., via application programming interfaces (APIs) responsive to Hypertext Transfer Protocol (HTTP) requests.

The users 142 can use a variety of devices to leverage blockchain platforms to enable device-to-device and consumer-to-device transactions. The devices can have their own blockchain accounts and associated smart contracts. The smart contracts can store information on the device identities and usage patterns. The devices can send transactions to the associated smart contracts and receive transactions from the peers on the blockchain network 126. This can be achieved by running a blockchain client on the devices that uses a controller service to connect the devices to the blockchain network 126. An example of a blockchain client is EthJsonRpc Python™ client for Ethereum™ that uses JSON-based remote procedure calls (RPCs) to implement client-specific methods and provides a high-level interface to create smart contracts on Ethereum™ and to call contract functions. When the users 142 wish to avail of the services of the devices, they can transact with the smart contracts associated with the devices.

The disclosed NFT platform 102 utilizes one or more immutable ledgers (e.g., the blockchain 126) to provide provenance for assets 112 (e.g., physical collectibles like paintings, other forms of art, clothing, furniture, and so on, digital multimedia like images, videos, and AI systems). One example of AI systems is generative adversarial networks (GANs). GANs are used to create AI-generated artwork. GANs take a game-theoretical approach to machine learning by making use of two simultaneously trained networks that are tasked with outperforming each other. The first network, or the generative model, begins with a sample of random data and generates a random output image. Since the data used to generate the image is random, the first several images created by the GAN's generative model will appear crude and shapeless. Then, the second network, or the discriminative model, tries to determine whether the generative model's output image is generated or real. Both networks are trained via backpropagation, and, as the generative model and discriminative model try to outmaneuver one another, the overall performance of the GAN improves. Thus, over time, the GAN's generative model creates images that are more difficult to distinguish from the real ones. Over time, the generated output images are no longer distinguishable from the real images. Other ways to generate AI-generated multimedia besides GANs include generative models using machine learning or deep learning. In other implementations, signal processing or image processing algorithms can be used to generate such AI-generated multimedia. It should be appreciated that these examples are provided for illustrative purposes only and other examples are contemplated.

The disclosed NFT platform 102 enables content owners (e.g., artists) to access an NFT service to mint NFTs in numerous forms, such as proof of ownership of tangible collectibles, proof of ownership of AI-generated multimedia, etc. In addition, the smart contract interface 146 underlying the digital tickets can require residual payments when the NFTs are transferred on a secondary market, for example, via a satellite provenance system 144.

Issuance of the NFTs via the disclosed NFT platform 102 enables verification of the authenticity of the NFTs independently of the content owner by confirming that transactions written to one or more of the immutable ledgers are consistent with the smart contracts underlying the NFTs. In some implementations, the smart contracts underlying the NFTs can cause payments of residual royalties when the users 142 engage in specific transactions involving the NFTs (e.g., transfer of ownership of the NFT). In some implementations, the users 142 utilize wallet applications 143 on their devices to store the NFTs distributed using the disclosed NFT platform 102. The NFTs that are implemented using the smart contract comprise interfaces that comply with open standards and are not limited to being stored within wallets. Furthermore, the disclosed NFT platform 102 supports moving the NFTs between different immutable ledgers.

The interconnection of the elements of environment 100 will now be described. Network(s) 134 couples the disclosed NFT platform 102, the datastore 114, the blockchain network 126, the users 142, the wallet apps 143, the satellite provenance system 144, and the smart contract interface 146 all in communication with each other (indicated by solid double-arrowed lines). The actual communication path can be point-to-point over public and/or private networks. The communications can occur over a variety of networks, e.g., private networks, VPN, MPLS circuits, or Internet, and can use appropriate application programming interfaces (APIs) and data interchange formats, e.g., Representational State Transfer (REST), JavaScript Object Notation (JSON), Extensible Markup Language (XML), Simple Object Access Protocol (SOAP), Java Message Service (JMS), and/or Java Platform Module System. All of the communications can be encrypted. The communication is generally over a network such as the LAN (local area network), WAN (wide area network), telephone network (Public Switched Telephone Network (PSTN), Session Initiation Protocol (SIP), wireless network, point-to-point network, star network, token ring network, hub network, Internet, inclusive of the mobile Internet, via protocols such as EDGE, 3G, 4G LTE, Wi-Fi, and WiMAX. Additionally, a variety of authorization and authentication techniques, such as username/password, Open Authorization (OAuth), Kerberos, SecureID, digital certificates, and more, can be used to secure the communications. The engines or system components of FIG. 1 such as the disclosed NFT platform 102 are implemented by software running on varying types of computing devices. Example devices are a workstation, a server, a computing cluster, a blade server, and a server farm.

Provenance of New Outputs of AI Systems

Figure 2:
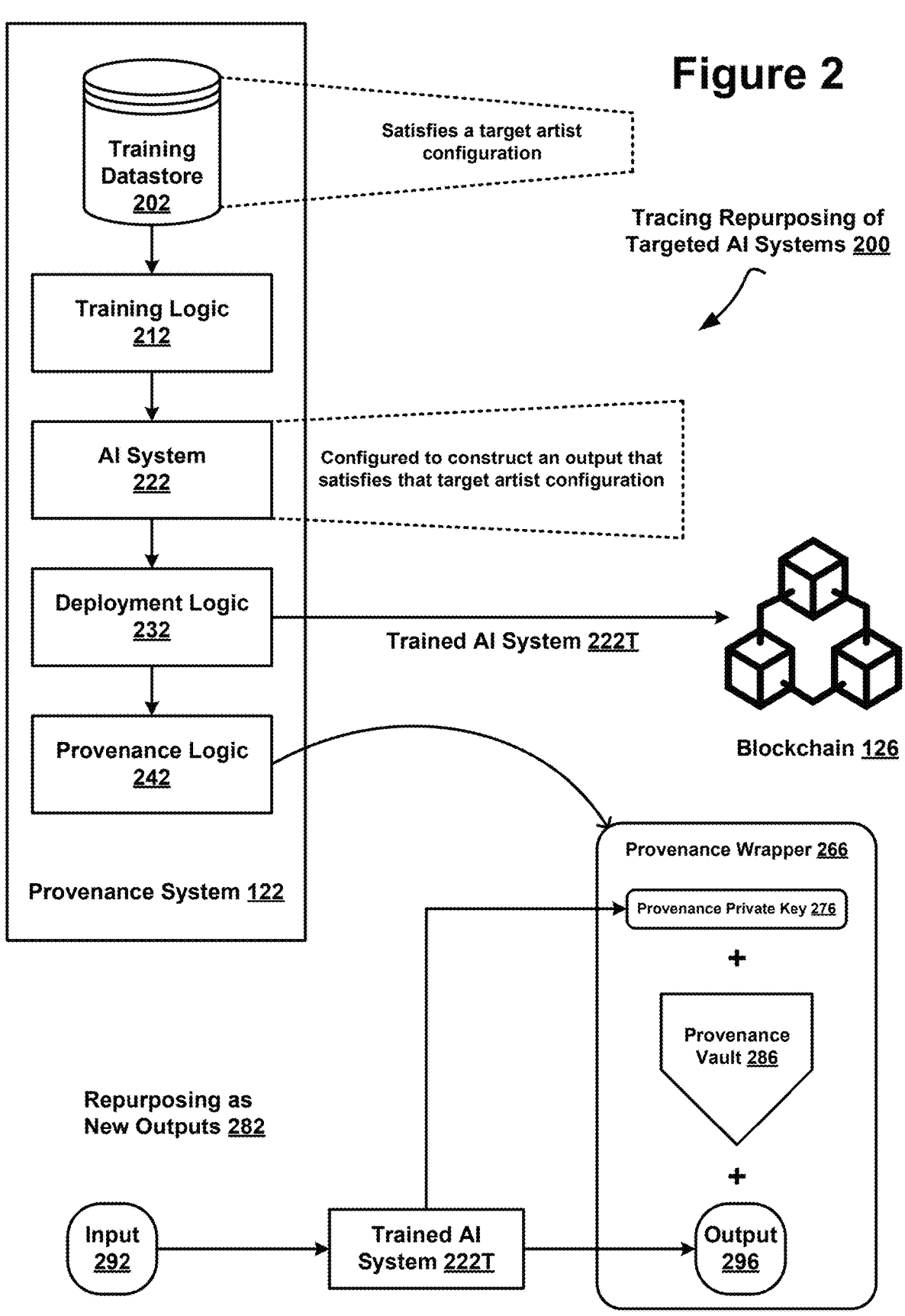
FIG. 2 shows one implementation of how the disclosed NFT platform provides provenance of tracing the repurposing of targeted artificial intelligence systems.

FIG. 2 shows one implementation of how the disclosed NFT platform 102 provides provenance 200 of tracing the repurposing of targeted artificial intelligence (AI) systems. Provenance 200 is implemented by a provenance system 122 of the disclosed NFT platform 102. A training datastore 202 includes a training dataset, for example, image or audio samples of a particular/target artist (e.g., Bob Dylan). The training dataset satisfies a target artist configuration by requiring that at least some training samples in the training dataset are sourced from the target artist. The target artist configuration characterizes the work of the target artist.

A training logic 212 trains an AI system 222 on the training dataset to generate a trained AI system 222T. The trained AI system 222T is configured to construct an output that satisfies that target artist configuration. Regarding the AI system 222, in one implementation, the AI system 222 is a multilayer perceptron (MLP). In another implementation, the AI system 222 is a feedforward neural network. In yet another implementation, the AI system 222 is a fully-connected neural network. In a further implementation, the AI system 222 is a fully convolution neural network. In a yet further implementation, the AI system 222 is a semantic segmentation neural network. In a yet another further implementation, the AI system 222 is a generative adversarial network (GAN) (e.g., CycleGAN, StyleGAN, pixelRNN, text-2-image, DiscoGAN, IsGAN). In a yet another implementation, the AI system 222 includes self-attention mechanisms like Transformer, Vision Transformer (ViT), Bidirectional Transformer (BERT), Detection Transformer (DETR), Deformable DETR, UP-DETR, DeiT, Swin, GPT, iGPT, GPT-2, GPT-3, BERT, SpanBERT, ROBERTa, XLNet, ELECTRA, UniLM, BART, T5, ERNIE (THU), KnowBERT, DeiT-Ti, DeiT-S, DeiT-B, T2T-VIT-14, T2T-VIT-19, T2T-VIT-24, PVT-Small, PVT-Medium, PVT-Large, TNT-S, TNT-B, CPVT-S, CPVT-S-GAP, CPVT-B, Swin-T, Swin-S, Swin-B, Twins-SVT-S, Twins-SVT-B, Twins-SVT-L, Shuffle-T, Shuffle-S, Shuffle-B, XCiT-S12/16, CMT-S, CMT-B, VOLO-D1, VOLO-D2, VOLO-D3, VOLO-D4, MoCo v3, ACT, TSP, Max-DeepLab, VisTR, SETR, Hand-Transformer, HOT-Net, METRO, Image Transformer, Taming transformer, TransGAN, IPT, TTSR, STTN, Masked Transformer, CLIP, DALL-E, Cogview, UniT, ASH, Tiny-Bert, FullyQT, ConvBert, FCOS, Faster R-CNN+FPN, DETR-DC5, TSP-FCOS, TSP-RCNN, ACT+MKDD (L=32), ACT+MKDD (L=16), SMCA, Efficient DETR, UP-DETR, UP-DETR, VITB/16-FRCNN, VIT-B/16-FRCNN, PVT-Small+RetinaNet, Swin-T+RetinaNet, Swin-T+ATSS, PVT-Small+DETR, TNT-S+DETR, YOLOS-Ti, YOLOS-S, and YOLOS-B.

In one implementation, the AI system 222 is a convolution neural network (CNN) with a plurality of convolution layers. In another implementation, the AI system 222 is a recurrent neural network (RNN) such as a long short-term memory network (LSTM), bidirectional LSTM (Bi-LSTM), or a gated recurrent unit (GRU). In yet another implementation, the AI system 222 includes both a CNN and an RNN.

In yet other implementations, the AI system 222 can use 1D convolutions, 2D convolutions, 3D convolutions, 4D convolutions, 5D convolutions, dilated or atrous convolutions, transpose convolutions, depthwise separable convolutions, pointwise convolutions, 1×1 convolutions, group convolutions, flattened convolutions, spatial and cross-channel convolutions, shuffled grouped convolutions, spatial separable convolutions, and deconvolutions. The AI system 222 can use one or more loss functions such as logistic regression/log loss, multi-class cross-entropy/softmax loss, binary cross-entropy loss, mean-squared error loss, L1 loss, L2 loss, smooth L1 loss, and Huber loss. The AI system 222 can use any parallelism, efficiency, and compression schemes such as TFRecords, compressed encoding (e.g., PNG), sharding, parallel calls for map transformation, batching, prefetching, model parallelism, data parallelism, and synchronous/asynchronous stochastic gradient descent (SGD). The AI system 222 can include upsampling layers, downsampling layers, recurrent connections, gates and gated memory units (like an LSTM or GRU), residual blocks, residual connections, highway connections, skip connections, peephole connections, activation functions (e.g., non-linear transformation functions like rectifying linear unit (ReLU), leaky ReLU, exponential liner unit (ELU), sigmoid and hyperbolic tangent (tanh)), batch normalization layers, regularization layers, dropout, pooling layers (e.g., max or average pooling), global average pooling layers, and attention mechanisms.

The AI system 222 can be a linear regression model, a logistic regression model, an Elastic Net model, a support vector machine (SVM), a random forest (RF), a decision tree, and a boosted decision tree (e.g., XGBoost), or some other tree-based logic (e.g., metric trees, kd-trees, R-trees, universal B-trees, X-trees, ball trees, locality-sensitive hashes, and inverted indexes). The AI system 222 can be an ensemble of multiple models, in some implementations.

In some implementations, the AI system 222 can be trained using backpropagation-based gradient update techniques. Example gradient descent techniques that can be used for training the AI system 222 include stochastic gradient descent, batch gradient descent, and mini-batch gradient descent. Some examples of gradient descent optimization algorithms that can be used to train the AI system 222 are Momentum, Nesterov accelerated gradient, Adagrad, Adadelta, RMSprop, Adam, AdaMax, Nadam, and AMSGrad.

The trained AI system 222T can be considered as a "brain" or "AI brain" of the target artist because the trained AI system 222T memorizes patterns or motifs that are characteristic of the target artist's work and can generate new outputs that represent the target artist's work. For example, a GAN AI model trained to reconstruct Picasso paintings can regenerate new images that have an overlay of Picasso theme. As another example, a WaveNet AI model can regenerate audio mix with a Bob Dylan music overlay. This way, the GAN can be considered Picasso's brain and the WaveNet can be considered Bob Dylan's brain.

A deployment logic 232 is configured to make available the trained AI system 222T via the blockchain network 126.

A provenance logic 242 is configured to provide access to the trained AI system 222T, and to validate that new outputs generated by repurposing the trained AI system 222T satisfy the target artist configuration. In one implementation, the provenance logic 242 provides provenance for new outputs (e.g., output 296) generated by the trained AI system 222T in response to processing new inputs (e.g., input 292) using and parent and offspring NFTs, such that a parent NFT is assigned to the trained AI system 222T, and offspring NFTs that point back to the parent NFT, are assigned to new outputs generated by the trained AI system 222T.

In one implementation, the provenance logic 242 provides provenance for new outputs 282 (e.g., output 296) generated by the trained AI system 222T in response to processing new inputs (e.g., input 292). This is accomplished by the provenance logic 242 linking a provenance wrapper 266 to the new outputs 282. In one implementation, the provenance wrapper 266 is associated with the new outputs 282 as parts of the underlying NFTs that include the new outputs 282. This way the provenance wrapper 266 lives on the blockchain network 126, either as the same block as the underlying NFTs that host the new outputs 282, or as a separate linked block.

The provenance wrapper 266 includes a provenance private key 276 that is generated by the provenance logic 242. The provenance private key 276 can be generated by the use of hash functions and/or hash of hashes functions that are used to create fixed length digests of arbitrarily long input strings, sometimes referred to as hash sequences or transaction hashes. Various families of hash functions are available, such as MD, SHA-1, SHA-2, SHA-3, RIPEMD, and Whirlpool. As an example, SHA-2 category includes four functions defined by the number of bits of the hash: SHA-224, SHA-256, SHA-384, and SHA-512. In another example, SHA-3 family includes the following members: SHA3-224, SHA3-256, SHA3-384, and SHA3-512 as members. SHA-3 is a NIST-standardized version of the Keccak cryptographic hash function. In some implementations, the hash functions can be used in conjunction with arithmetic operations. The arithmetic operations can be modulo $2^{256}$ operations, such as modulo remainder (MOD) operation, signed modulo reminder (SMOD) operation, and modulo addition (ADDMOD) operation. In some cases, smart contracts may be used to enforce ownership, case of access, and exchange policies for each unique NFT linked to an AI model, as illustrated in FIG. 16.

The provenance wrapper 266 also includes a provenance vault 286 that is accessible by the provenance private key 276. The provenance vault 286 includes provenance information such as the creator's list. The creator's list can authenticate that the new outputs are generated by the trained AI system 222T. The creator's list can further authenticate that the trained AI system 222T is the target artist's brain and was trained on a training dataset comprising training examples that represent the target artist's authenticated work. The creator's list can further authenticate that the target artist authorized the use of his or her work as training data for training the trained AI system 222T. The creator's list can further authenticate that the disclosed NFT platform is authorized to offer the trained AI system 222T, for example, by virtue of a collaboration with the target artist or another content provider like SONY™ or Disney™ who has rights to publish, distribute, license, sell, or otherwise provide and make available the target artist's work. The creator's list can also list previous owners of the underlying NFT, i.e., the output generated by the trained AI system 222T. The provenance vault 286 may function as a self-sovereign, decentralized digital identity management tool. A secure personal asset & data vault where an NFT owner can authenticate and view NFTs that they own.

Provenance of New Versions of AI Systems

Figure 3:
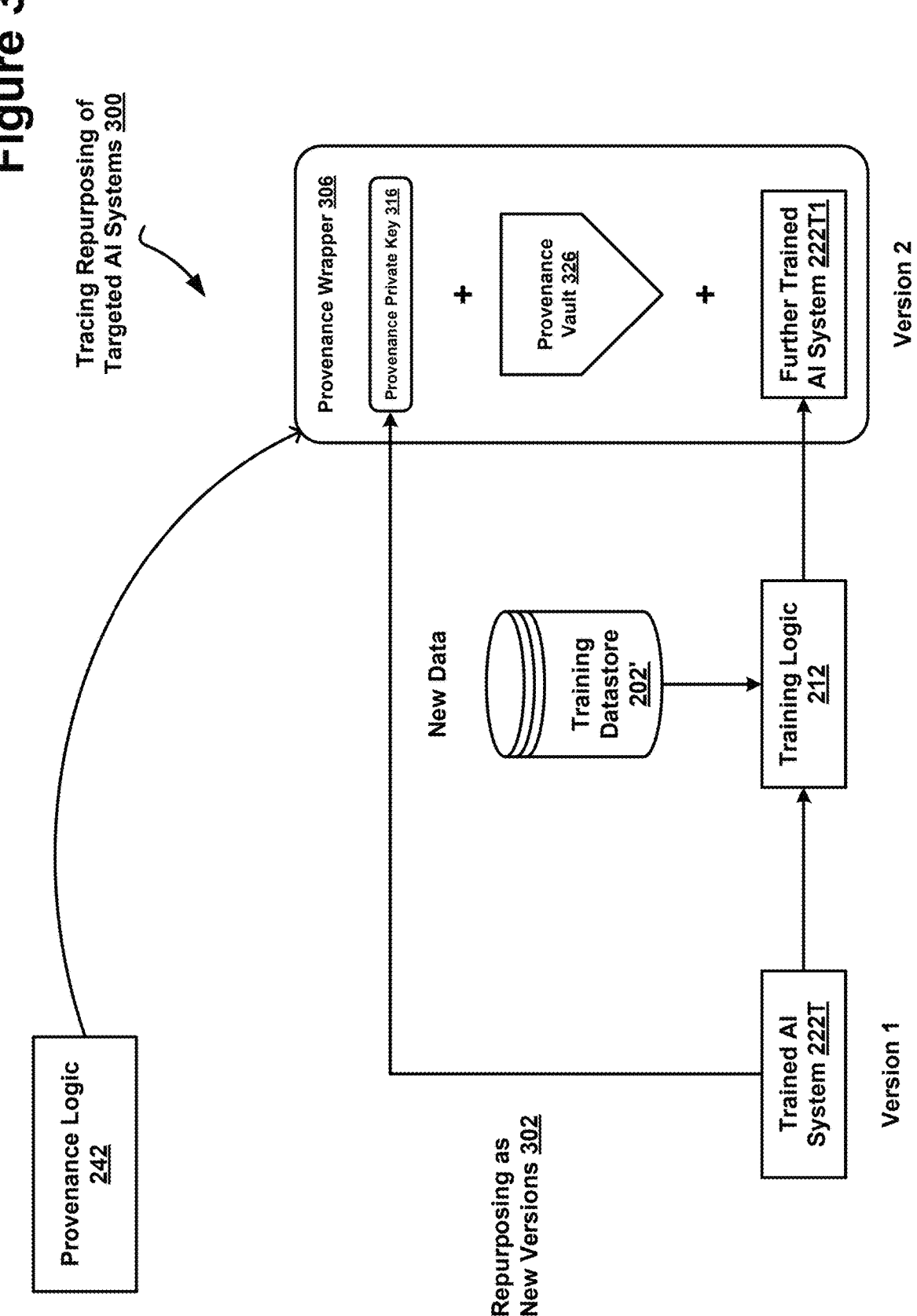
FIG. 3 shows another implementation of how the disclosed NFT platform provides provenance of tracing the repurposing of targeted artificial intelligence systems.

FIG. 3 shows another implementation of how the disclosed NFT platform 102 provides provenance 300 of tracing the repurposing of targeted artificial intelligence systems.

In one implementation, the provenance logic 242 provides provenance for new versions 302 of the trained AI system 222T (e.g., the further trained AI system 222T1) generated in response to training the trained AI system 222T on new or updated training data (e.g., training datastore 202'). This is accomplished by the provenance logic 242 linking a provenance wrapper 306 to the new versions 302. In one implementation, the provenance wrapper 306 is associated with the new versions 302 as parts of the underlying NFTs that include the new versions 302. This way the provenance wrapper 266 lives on the blockchain network 126, either as the same block as the underlying NFTs that host the new versions 302, or as a separate linked block. See also FIG. 17.

The provenance wrapper 306 includes a provenance private key 316 that is generated by the provenance logic 242.

The provenance wrapper 306 also includes a provenance vault 326 that is accessible by the provenance private key 316. The provenance vault 326 includes provenance information such as the creator's list. The provenance vault 326 can authenticate that the weights of the further trained AI system 222T1 are derived from the weights of the trained AI system 222T. The provenance vault 326 can authenticate that the further trained AI system 222T1 was trained on the training datastore 202', and that the training datastore 202' indeed is the target artist's authenticated work, albeit different from the training datastore 202 and an updated version of the training datastore 202.

Provenance of New Licenses of AI Systems

Figure 4:
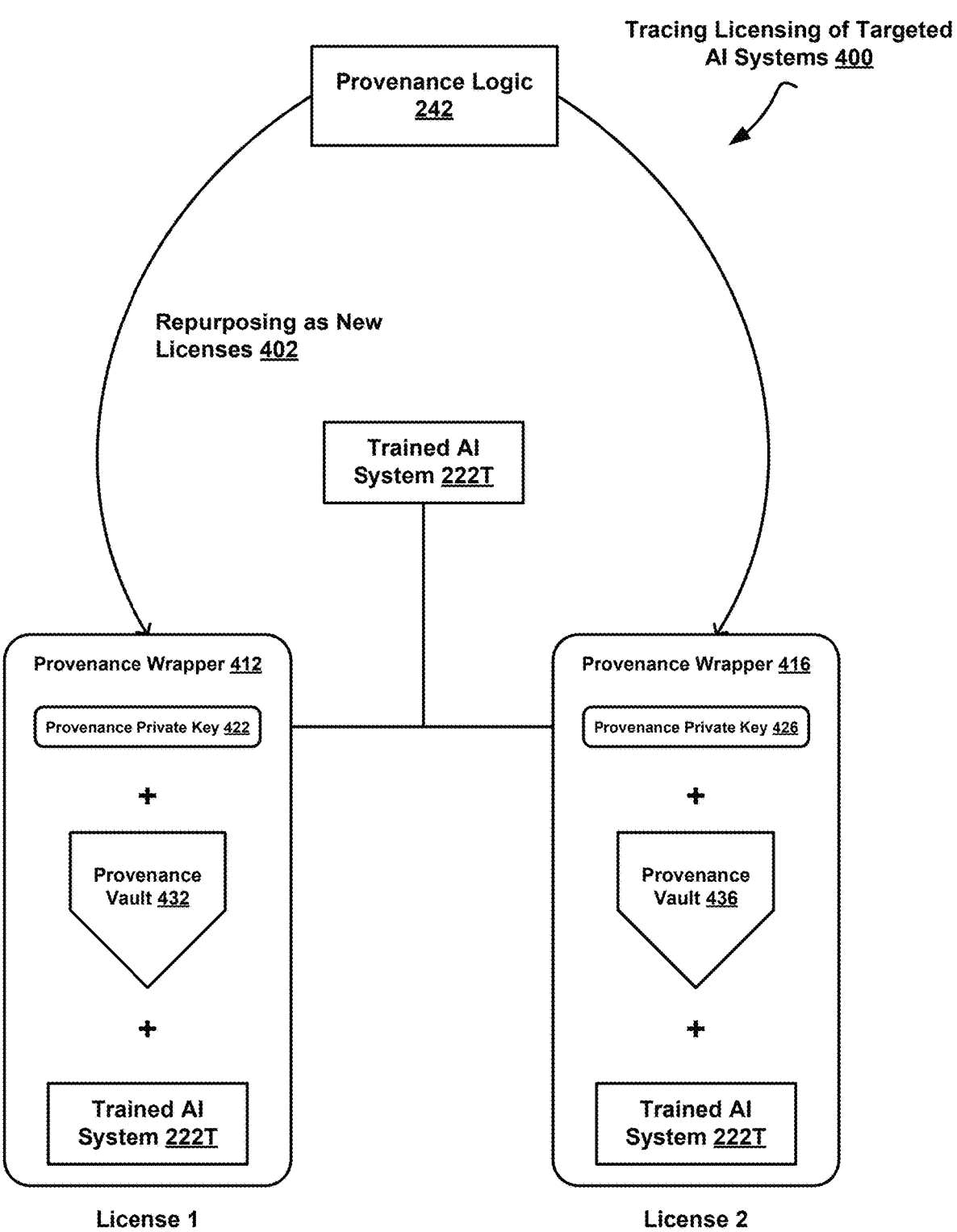
FIG. 4 shows one implementation of how the disclosed NFT platform provides provenance of tracing the licensing of targeted artificial intelligence systems.

FIG. 4 shows one implementation of how the disclosed NFT platform 102 provides provenance 400 of tracing the licensing of targeted artificial intelligence systems.

In one implementation, the provenance logic 242 provides provenance for new licenses 402 of the trained AI system 222T. This is accomplished by the provenance logic 242 linking respective provenance wrappers 412 and 416 to the respective new licenses 402. In one implementation, the respective provenance wrappers 412 and 416 are associated with the new licenses 402 as parts of the respective underlying NFTs that include the new licenses 402. This way the respective provenance wrappers 412 and 416 live on the blockchain network 126, either as the same block as the underlying NFTs that host the new licenses 402, or as a separate linked block.

The respective provenance wrappers 412 and 416 include respective provenance private keys 422 and 426 that are generated by the provenance logic 242. The respective provenance wrappers 412 and 416 also include respective provenance vaults 432 and 436 that are respectively accessible by the respective provenance private keys 422 and 426. The respective provenance vaults 432 and 436 can authenticate that the new licenses 402 are indeed authentic licenses of the trained AI system 222T. The respective provenance vaults 432 and 436 include provenance information such as the creator's list. The creator's list can authenticate that the new outputs are generated by authentic licenses of the trained AI system 222T. The creator's list can further authenticate that the trained AI system 222T is the target artist's brain and was trained on a training dataset comprising training examples that represent the target artist's authenticated work. The creator's list can further authenticate that the target artist authorized the use of his or her work as training data for training the trained AI system 222T. The creator's list can further authenticate that the disclosed NFT platform is authorized to offer the trained AI system 222T, for example, by virtue of a collaboration with the target artist or another content provider like SONY™ or Disney™ who has rights to publish, distribute, license, sell, or otherwise provide and make available the target artist's work. The creator's list can also list previous owners of the underlying NFT, i.e., the output generated by the trained AI system 222T.

Reconstruction of Provenance Private Key During Asset Acquisition

Figure 5:
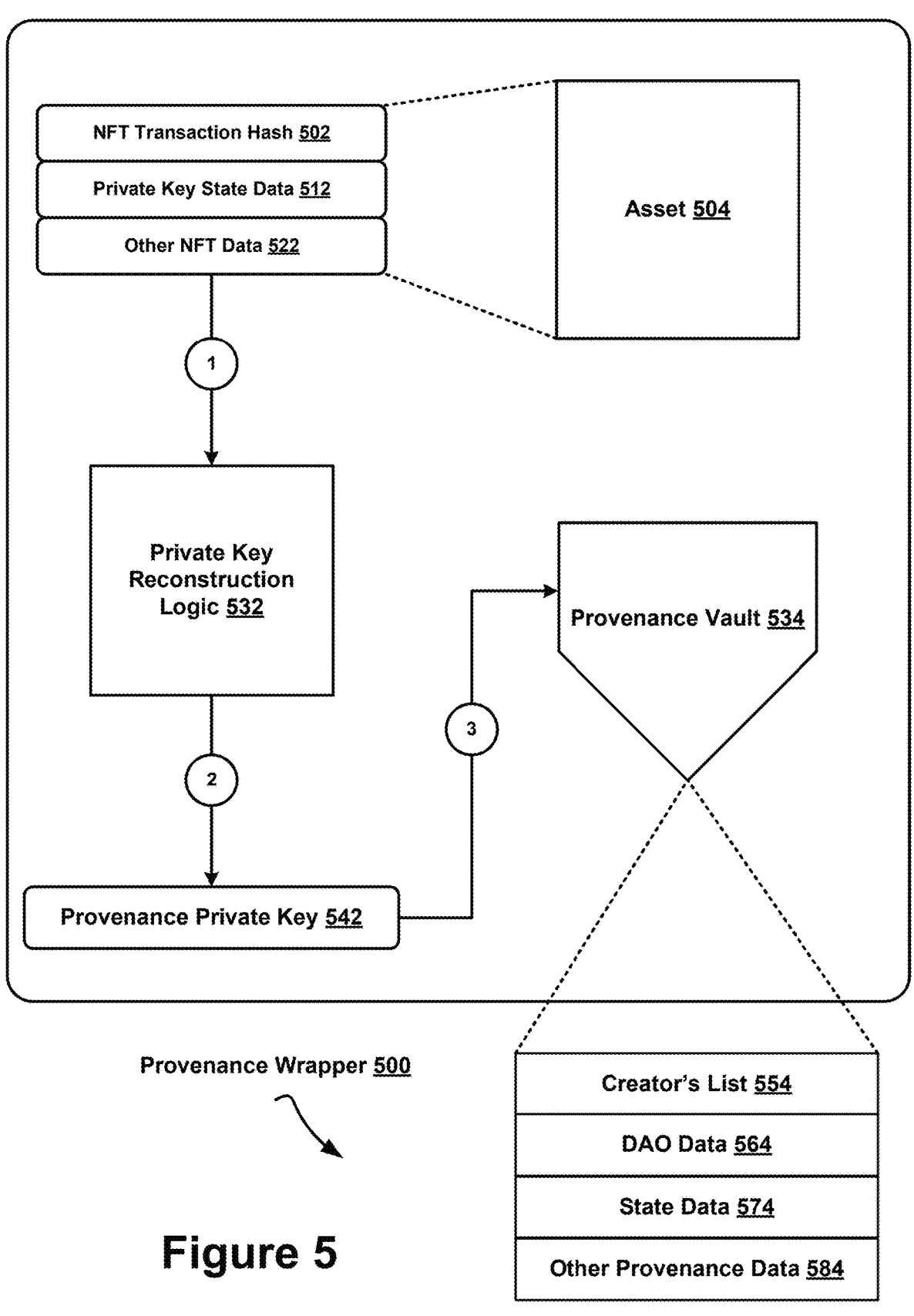
FIG. 5 illustrates one implementation of the reconstruction of a provenance private key by a provenance wrapper to enable access to a provenance vault during asset acquisition on the disclosed NFT platform.

FIG. 5 illustrates one implementation of the reconstruction of a provenance private key by a provenance wrapper 500 to enable access to a provenance vault during asset acquisition on the disclosed NFT platform 102. When a user of the disclosed NFT platform 102 is interested in learning the provenance information about an asset 504 hosted by the disclosed NFT platform 102, then at action one, the user can provide information such as an NFT transaction hash 502 of the asset 504, a private key state data 512 of the asset 504, and/or other NFT data 522 of the asset 504, as input to a private key reconstruction logic 532. The private key reconstruction logic 532 can be hosted on the disclosed NFT platform 102, or outside the disclosed NFT platform 102, such as on the satellite provenance system 144.

At action two, the private key reconstruction logic 532 generates a provenance private key 542 in response to processing the NFT transaction hash 502 of the asset 504, the private key state data 512 of the asset 504, and/or the other NFT data 522 of the asset 504.

At action three, the provenance private key 542 is used to access a provenance vault 534. The provenance vault 534 contains information like a creator's list 554, decentralized anonymous organization (DAO) data 564, state data 574, and/or other provenance data 584. The DAO data 564 identifies a DAO that was used to publish/drop the asset 504. The state data 574 identifies, for example, state information about the blockchain 126 (e.g., the number of nodes, the number of miners), and state information about the asset 504 itself (e.g., number of layers of the AI system, and summary statistics (e.g., standard deviation, mean of the weights of the AI system).

Generating Provenance Private Key During Inference of AI Systems

Figure 6:
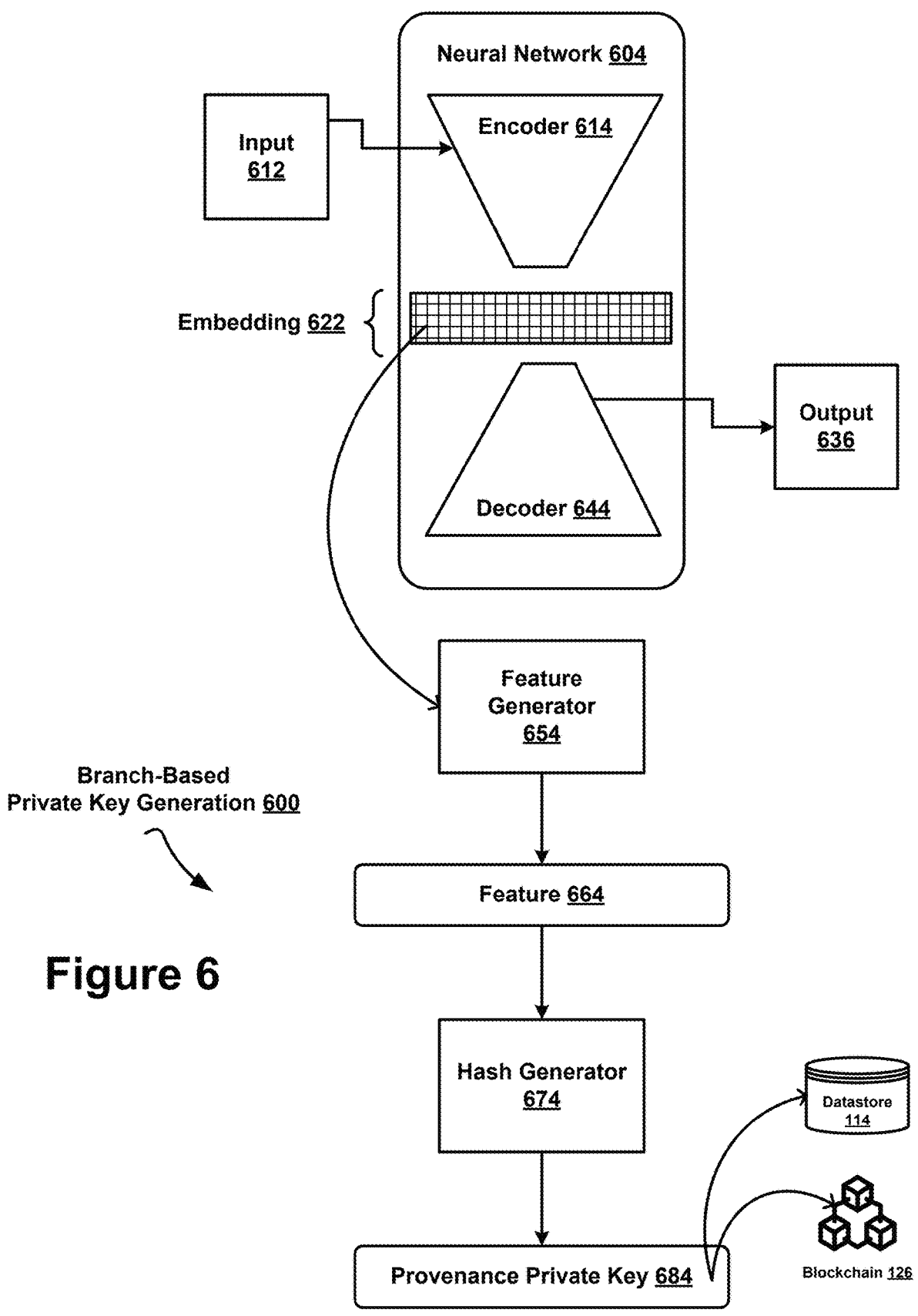
FIG. 6 is one implementation of the disclosed NFT platform generating a provenance private key during the inference of an artificial intelligence (AI) system and linking the provenance private key to an output generated by the AI system during the inference for downstream provenance.

FIG. 6 is one implementation of the disclosed NFT platform 102 generating 600 a provenance private key during the inference of an artificial intelligence (AI) system and linking the provenance private key to an output generated by the AI system during the inference for downstream provenance.

In one implementation, a neural network 604 comprises an encoder 614 and a decoder 644. The encoder 614 processes an input 612 and outputs a compressed embedding 622 of the input 612. The compressed embedding 622 of the input 612 is encoded in a hidden representation space (or latent space). This is referred to as a "bottleneck" because the encoder 614 learns to project a compressed representation of the input 612 into a lower-dimensional latent space. The lower-dimensional latent space is stochastic because the encoder 614 outputs parameters to a Gaussian probability density.

The decoder 644 takes as input the compressed embedding 622 of the input 612 and reconstructs an output 636. Then, a feature generator 654 (e.g., a linear layer) processes the compressed embedding 622 and generates a feature 664 as output. Then, a hash generator uses a hash function to generate a hash of the feature 664, with the hash being used downstream a provenance private key 684, which in turn can be stored on the datastore 114 or on the blockchain 126 and associated with the output 636 for downstream provenance, for example, as depicted in FIG. 5.

Generating Provenance Private Key During Training of AI Systems

Figure 7:
FIG. 7 is another implementation of the disclosed NFT platform generating a provenance private key during the training of an artificial intelligence (AI) system and linking the provenance private key to the AI system for downstream provenance.

FIG. 7 is another implementation of the disclosed NFT platform 102 generating 700 a provenance private key during the training of an artificial intelligence (AI) system and linking the provenance private key to the AI system for downstream provenance.

Figure 8:
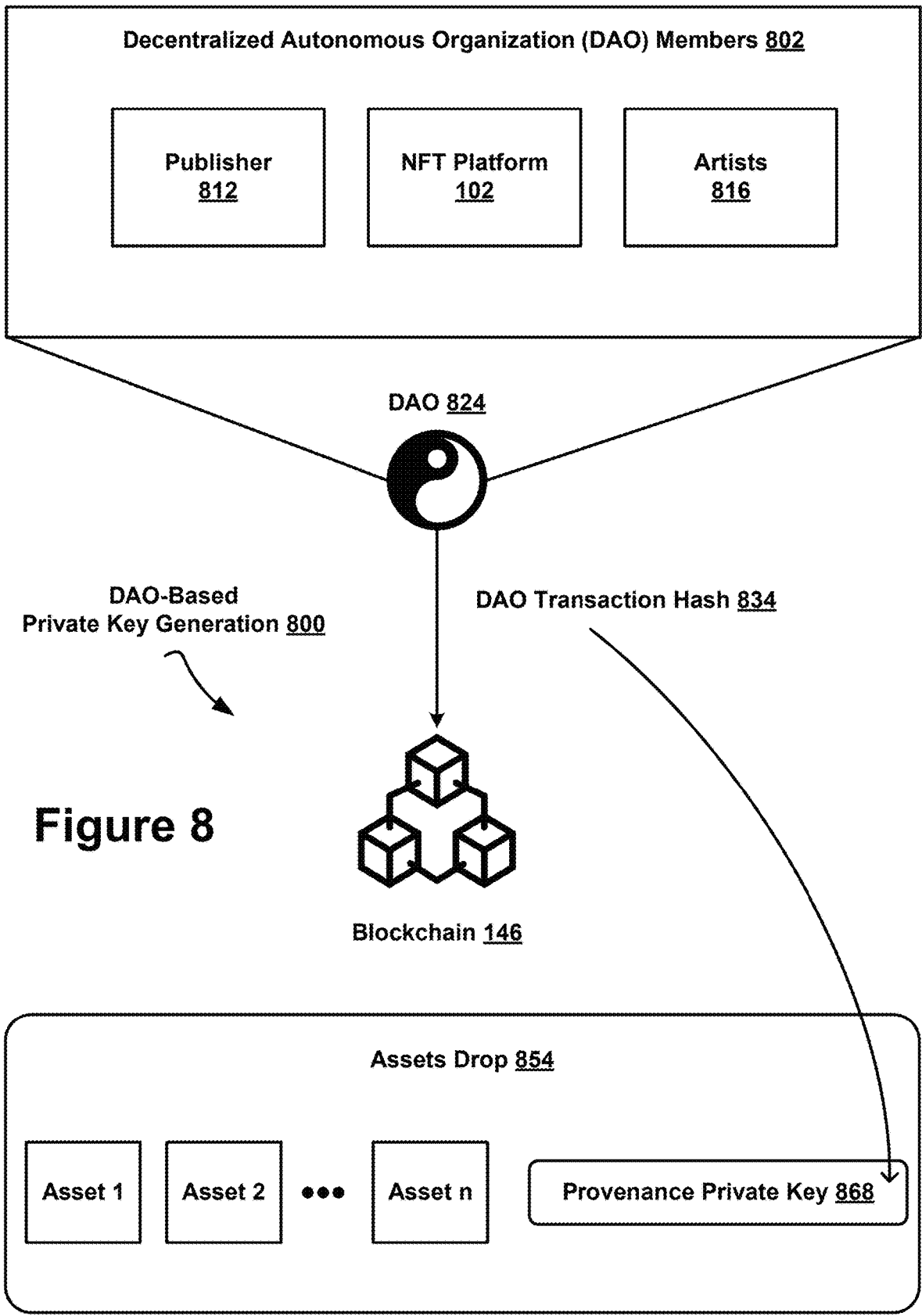
FIG. 8 illustrates one implementation of using a decentralized autonomous organization (DAO) to establish provenance of digital assets on the disclosed NFT platform.

In one implementation, an AI system 704 has various state data associated with it, such as summary statistics about its weights (e.g., standard deviation 714, mean 724), a random seed 734, a state 744 of the blockchain 126 (the number of nodes or miners) when the AI system 704 was trained, and a creation state 754. One or more such state data can be fed as input to a hash generator 764 to generate a provenance private key 774, which in turn can be stored on the datastore 114 or on the blockchain 126 and associated with the AI system 704 and/or an output of the AI system 704 for downstream provenance, for example, as depicted in FIG. 5.
DAO Private Key for Provenance of Dropped Assets FIG. 8 illustrates one implementation of using a decentralized autonomous organization (DAO) to establish the provenance 800 of digital assets dropped on the disclosed NFT platform 102 by a plurality of members. In some implementations, content creators like artists 816, content publishers 812 like SONY™ and Disney™, and the disclosed NFT platform 102 can execute a DAO 824 as DAO members 802. Specifically, the DAO 824 is an organization represented by rules encoded as a computer program that is transparent, controlled by the organization members, and not influenced by a central government. A DAO's financial transaction record and program rules are maintained on a blockchain. Moreover, the DAOs are typified by the use of blockchain technology to provide a secure digital ledger to track financial interactions across the Internet. This approach eliminates the need to involve a mutually acceptable trusted third party in a financial transaction, thus simplifying the transaction. The costs of a blockchain-enabled transaction and of the associated data reporting may be substantially offset by the elimination of both the trusted third party and of the need for repetitive recording of contract exchanges in different records. In a centralized manner, the group of specific people will decide if the proposal should be applied.

Figure 9:
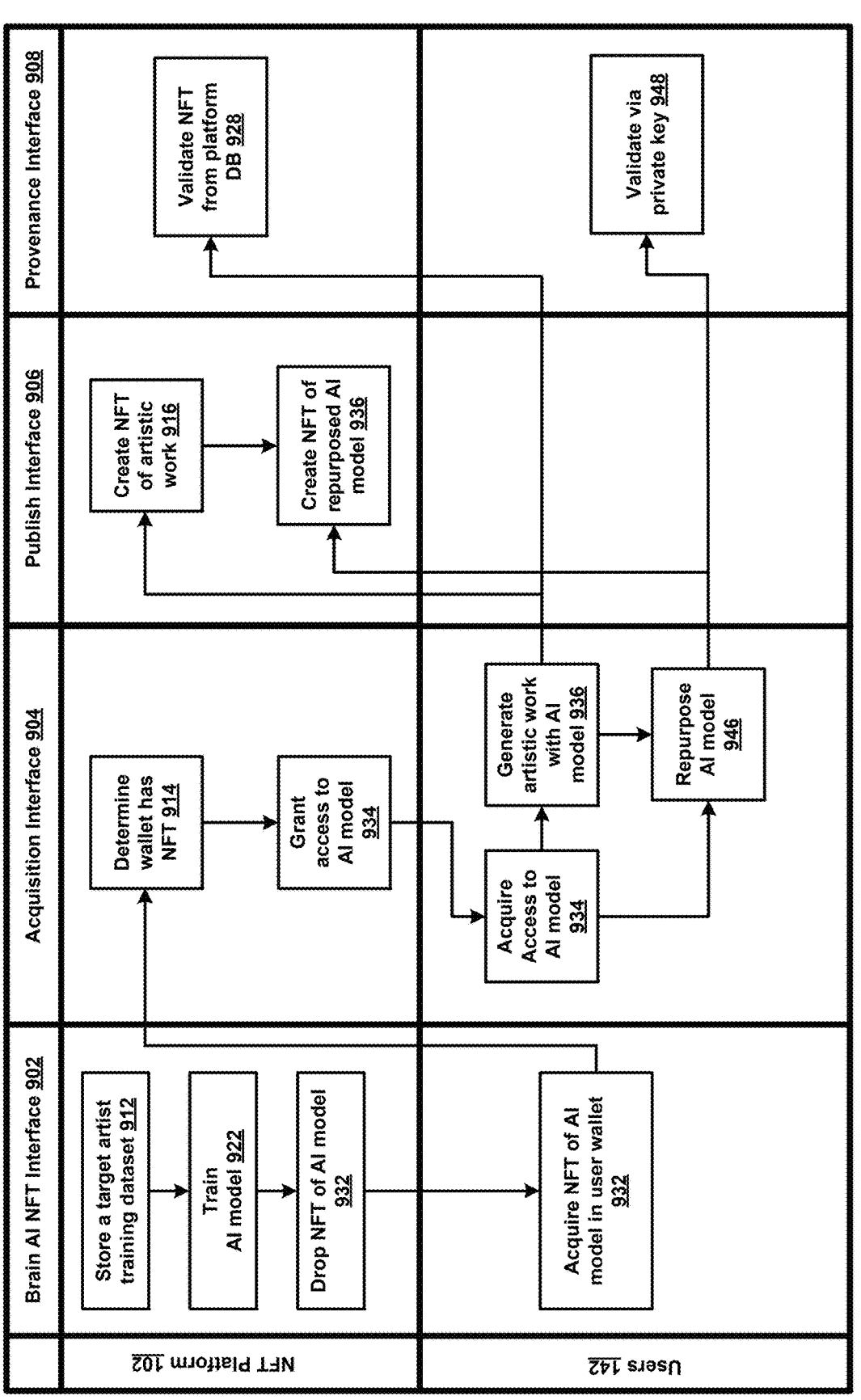
FIG. 9 shows examples of different interfaces the disclosed NFT platform presents to the users.

Then, when the DAO members 802 publish/drop assets 854 on the disclosed NFT platform 102, a DAO transaction hash 834 can be used as a provenance private key 868 for downstream provenance, for example, as depicted in FIG. 8. In some cases, an identity management system may be used in addition to DAOs for registering content creators, such as artists and content publishers (e.g., Disney®). First tier content sources may prefer that the NFT platform 102 is registered with a trusted central authority (e.g., rather than a DAO). Buyers of expensive NFT art also may favor a trusted central authority to vouch for artists and publishers.
Interfaces of the NFT Platform FIG. 9 shows examples of different interfaces the disclosed NFT platform 102 presents to the users. Examples of the different interfaces include a Brain AI NFT interface 902, an acquisition interface 904, a publish interface 906, and a provenance interface 908.

The Brain AI NFT interface 902 is used to drop an NFT of an AI model 932. The AI model is trained 922 using a target artist training dataset 912. The users 142 access the NFT using a wallet 932.

The acquisition interface 904 is used to determine 914 whether the wallet has the NFT, and to grant access 934 to the AI model. The users 142 then acquire access 934 to the AI model, generate 936 artistic work with the AI model, and repurpose 946 the AI model.

The publish interface 906 is used to create 916 an NFT of the artistic work, and to create an NFT of the results 936 of repurposing the AI model.

Figure 11:
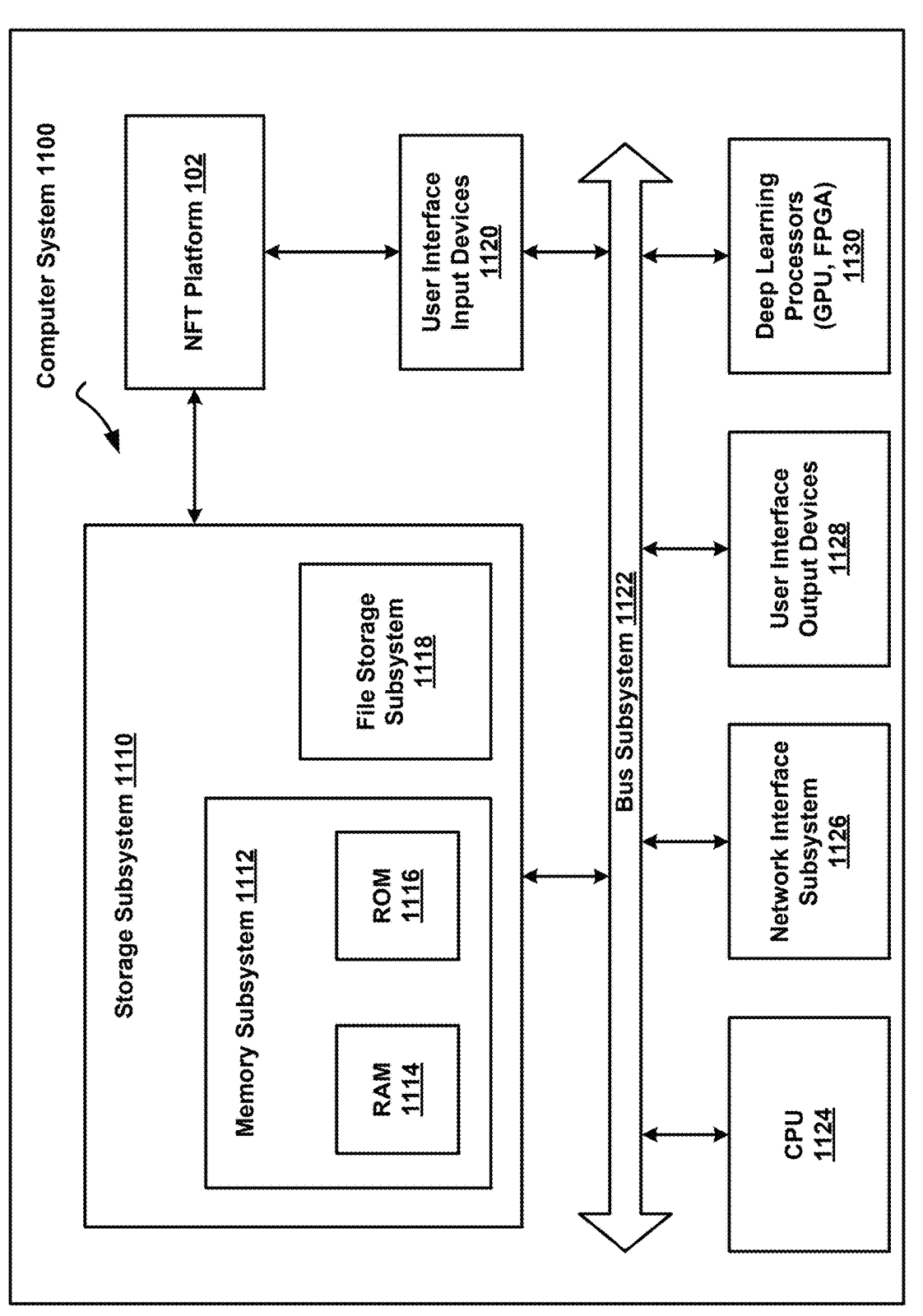
FIG. 11 shows an example computer system that can be used to implement the disclosed NFT platform.

The provenance interface 908 is used to validate 928 the NFT from a database of the NFT platform 102, and to validate 948 the provenance private keys.
Fractionalized Ownership and Credit Flow for AI Systems FIG. 10 illustrates one implementation of the disclosed NFT platform establishing 1000 fractional ownership of AI systems and fractionalized credit flow to the fractional owners of credit resulting from the repurposing of the AI systems. The technology disclosed can fractionalize an AI system such as a neural network at various resolutions, such as on a per-layer basis, per-node in a layer basis, groups of layers, and so. Then, multiple owners can be assigned to different fractions of the AI system, such that the credit 1012 resulting from licensing or sale of the AI system is assigned back to the multiple fractional owners using a fractionalized credit flow 1002. In other implementations, a fractionalized consensus of the fractionalized owners can be acquired for uses of the AI system in a similar manner.
Computer System FIG. 11 shows an example computer system 1100 that can be used to implement the disclosed NFT platform 102. Computer system 1100 includes at least one central processing unit (CPU) 1172 that communicates with a number of peripheral devices via bus subsystem 1155. These peripheral devices can include a storage subsystem 1110 including, for example, memory devices and a file storage subsystem 1136, user interface input devices 1138, user interface output devices 1176, and a network interface subsystem 1174. The input and output devices allow user interaction with computer system 1100. Network interface subsystem 1174 provides an interface to outside networks, including an interface to corresponding interface devices in other computer systems.

In one implementation, the disclosed NFT platform 102 is communicably linked to the storage subsystem 1110 and the user interface input devices 1138.

User interface input devices 1138 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 1100.

User interface output devices 1176 can include a display subsystem, a printer, a fax machine, or non-visual displays such as audio output devices. The display subsystem can include an LED display, a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 1100 to the user or to another machine or computer system.

Storage subsystem 1110 stores programming and data constructs that provide the functionality of some or all of the modules and methods described herein. These software modules are generally executed by processors 1178.

Processors 1178 can be graphics processing units (GPUs), field-programmable gate arrays (FPGAs), application-specific integrated circuits (ASICs), and/or coarse-grained reconfigurable architectures (CGRAs). Processors 1178 can be hosted by a deep learning cloud platform such as Google Cloud Platform™, Xilinx™, and Cirrascale™ Examples of processors 1178 include Google's Tensor Processing Unit (TPU)™, rackmount solutions like GX4 Rackmount Series™, GX11 Rackmount Series™, NVIDIA DGX-1™, Microsoft' Stratix V FPGA™, Graphcore's Intelligent Processor Unit (IPU)™, Qualcomm's Zeroth Platform™ with Snapdragon processors™, NVIDIA's Volta™, NVIDIA's DRIVE PX™, NVIDIA's JETSON TX1/TX2 MODULE™, Intel's Nirvana™, Movidius VPU™, Fujitsu DPI™, ARM's DynamicIQ™, IBM TrueNorth™, Lambda GPU Server with Testa V100s™, and others.

Memory subsystem 1122 used in the storage subsystem 1110 can include a number of memories including a main random access memory (RAM) 1132 for storage of instructions and data during program execution and a read only memory (ROM) 1134 in which fixed instructions are stored. A file storage subsystem 1136 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 1136 in the storage subsystem 1110, or in other machines accessible by the processor.

Bus subsystem 1155 provides a mechanism for letting the various components and subsystems of computer system 1100 communicate with each other as intended. Although bus subsystem 1155 is shown schematically as a single bus, alternative implementations of the bus subsystem can use multiple busses.

Computer system 1100 itself can be of varying types including a personal computer, a portable computer, a workstation, a computer terminal, a network computer, a television, a mainframe, a server farm, a widely-distributed set of loosely networked computers, or any other data processing system or user device. Due to the ever-changing nature of computers and networks, the description of computer system 1100 depicted in FIG. 11 is intended only as a specific example for purposes of illustrating the preferred implementations of the present invention. Many other configurations of computer system 1100 are possible having more or less components than the computer system depicted in FIG. 11.

Figure 12:
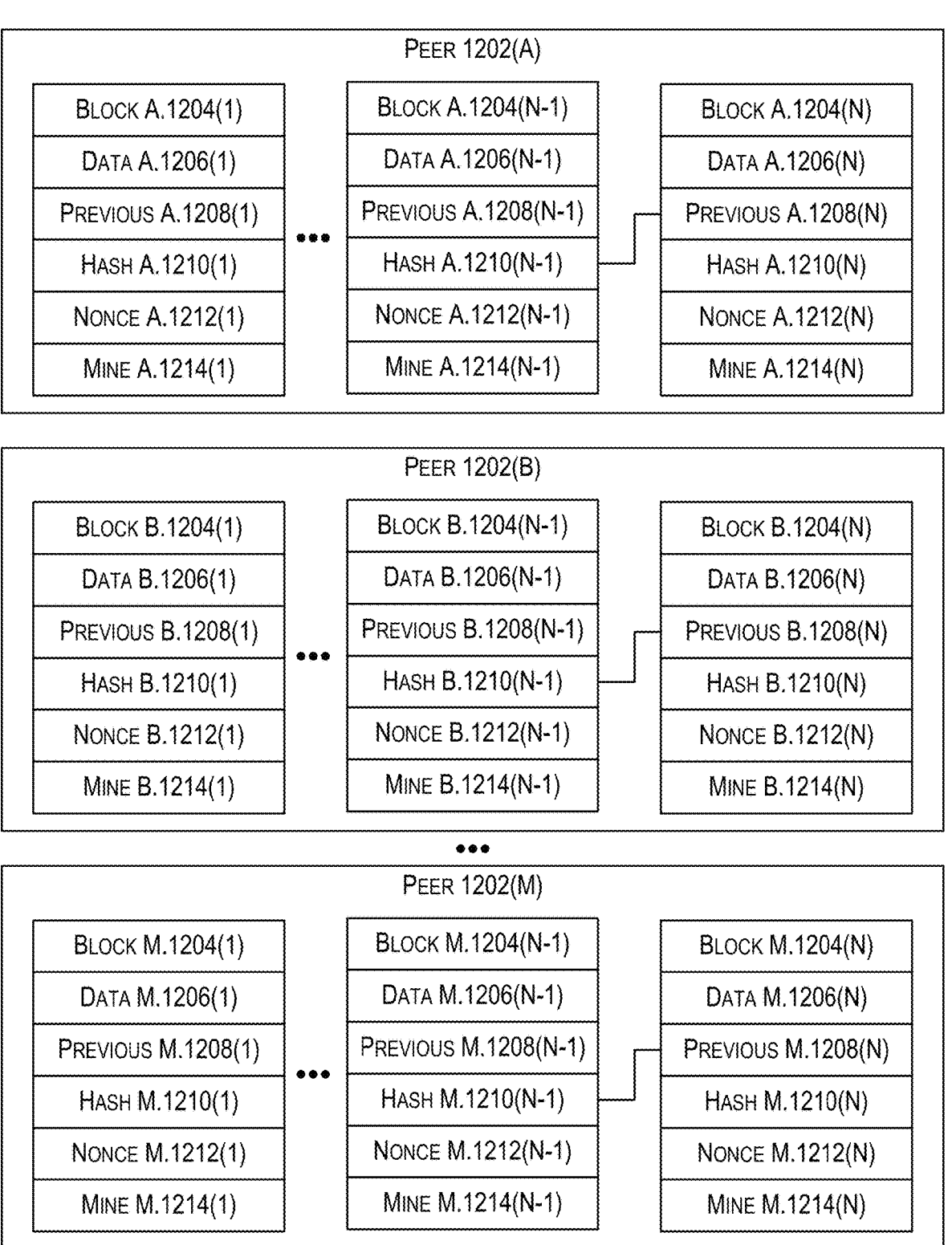
FIG. 12 shows an example of a blockchain that can be used to implement a portion of the disclosed NFT platform.

FIG. 12 shows an example of a blockchain that can be used to implement the disclosed NFT platform. A blockchain in FIG. 12 is a distributed ledger. Multiple peers 1202(A), 1202(B) to 1202(M) (M>2) each store a copy of the same blockchain. In the event that the blockchain stored by a particular one of the peers 1202 is corrupted, the peers "vote" on the correct blockchain, with the number of identical blockchains used to determine which is the "correct" blockchain. For example, with three peers, if one of the blockchain copies is different from the other two copies, then the copy that is different is corrupt. The other 2 copies may be used to replace the corrupted blockchain with the correct (e.g., uncorrupted) blockchain.

Each peer may include a block 1204, data 1206, a previous hash 1208, a hash 1210, a nonce 1212, and a way to mine 1214. For example, (1) peer 1202(A) has blocks A.1204(1) to A.1204(N) (N>0), data A.1206(1) to A.1206 (N), and so on, (2) peer 1202(B) has blocks B.1204(1) to B.1204(N), data B.1206(1) to B.1206(N), and so on, (3) peer 1202(M) (M>0) has blocks M.1204(1) to M.1204(N), data M.1206(1) to M.1206(N), and so on. The block 1204 identifies a location of a particular block in the blockchain. For example, block A.1204(1) is block #1 and block A.1204(N) is block #N. The data 1206 may include information associated with a particular NFT.

The hash 1210 is the result of performing a cryptographic hash (e.g., SHA 256 or another type of hash) on the block 1204, the nonce 1212, and the data 1206. The hash 1210 is always the same length, regardless of the amount of content in the block 1204, the nonce 1212, and the data 1206.

The previous 1208 field includes the hash 1206 of the previous block. For example, in FIG. 12, the previous 1208(N) of block 1204(N) includes the hash 1210(N-1) of the previous block 1204(N−1). In this way, the blocks form a type of one-way linked list as the previous block can be identified using the previous 1208 of a particular block. The first block 1204(1) (block #1) has a specific alphanumeric pattern (e.g., all zeros) in the previous 1208(1) indicating that there is no previous.

When the mine 1214 is selected, the nonce 1212 of a particular block is adjusted (known as mining) to adjust a portion of the hash 1210 to have a specified value, called a signature. For example, the mine 1214 may operate to adjust the nonce 1212 such that the first 4 alphanumeric characters of the hash 1210 are "0000" (or another string). In this way, whether a block is correct or corrupted can be determined by examining the signature portion of the hash. For example, if the signature portion of the hash 1210 is "0000" then the associated block is uncorrupted. If the signature portion of the hash 1210 is a value other than "0000", then the associated block is corrupted. If a particular block 1204 is determined to be corrupted, then the particular block 1204 and all subsequent blocks may be re-mined.

FIG. 13 shows an example of simplified JavaScript code defining a blockchain that can be used to implement a portion of the disclosed NFT platform. The class "Block" is defined as having an index (e.g., 1204(N) in FIG. 12), a timestamp (e.g., indicating when the block was created and which may be included in the data 1206 in FIG. 12)), data (e.g., 1206 in FIG. 12), a previous hash (e.g., 1208 in FIG. 12), and a hash (e.g., 1210 of FIG. 12) of the block.

For illustration purposes, the JavaScript illustrates creating a blockchain having 2 blocks. A FirstBlock is created on May 3, 2023 and has "0" as the previous hash. An addBlock function is used to add a block to the blockchain. A new NFT is assigned a new blockchain with a single block (First-Block). The addBlock function is used to add a 2nd block to the blockchain that starts with the firstblock.

FIG. 14 shows an example of JavaScript code to create a blockchain that can be used to implement a portion of the disclosed NFT platform. The blockchain has 2 blocks, a first block (index 0) and a second block (index 1). The previous hash field of the second block includes the hash of the first block.

FIG. 15 shows an example of JavaScript code to determine the validity (e.g., provenance) of a blockchain in the disclosed NFT platform. The code in FIG. 15 checks the validity of a blockchain by performing 2 checks. The first check calculates a hash (e.g., using SHA256 or another type of cryptographic hashing algorithm) of the current block and compares the calculated hash with the hash (e.g., 1210 of FIG. 12) stored with the current block. If the two are not equal ("!=="), then the chain is determined to be invalid. The second check compares the previous hash portion (e.g., 1208 in FIG. 12) of the current block with the hash stored with the previous block. If the two are not equal, then the chain is determined to be invalid.

If there are multiple peers, as shown in FIG. 12, then a third check may be added, in which the hash of a particular block in a peer is compared with the same block in other peers. If two or more peers have a hash that is different from the hash of the particular block, then the peer with the particular block includes a blockchain is invalid. For example, in FIG. 12, if hash A.1210(N) is different from each of hash B.1210(N) through hash M.1210(N), while hash B.1210(N) is the same as hash M.1210(N), then the blockchain stored by peer 1201(A) is not valid. The blockchain of peer 1202(A) may be restored using the blockchains stored by the other peers 1202(B) through 1202(M), by recalculating the hashes 1210 starting with the earliest valid block, or a combination of both.

FIG. 16 shows an example of JavaScript code of a smart contract that may be used in the disclosed NFT platform.

Each item in an NFT marketplace may have the structure of MarketItem and each market item may have one of 3 states: created, released, or inactive. All the NFT items in the marketplace may be stored in a mapping. The marketplace has an owner, also known as the contract deployer. The listing fee may be paid to the market owner when an NFT item is sold in the marketplace. An NFT is listed for sale in the marketplace by calling a createMarketItem function and providing a price for each item. The price may be a fixed price or a starting price for an auction.

Minting involves creating something for the first time, e.g., publishing a unique instance of an ERC721 token on the blockchain. ERC-721 is the standard for creating an NFT, and an ERC721 token is a unique representation of digital content published to the blockchain. No two tokens are the same, so each time a new token is minted, a new address is generated. A smart contract is an NFT when it implements ERC-721. Thus, an NFT is an instance of a smart contract. The smart contract code that has been deployed to the blockchain is use each time a new NFT is created.

FIG. 17 shows an example of pseudo code of wrapping that may be used in the disclosed NFT platform. WrapTxn initiates the NFT wrap function. If an error occurs (e.g., a user does not provide approval or a contract call fails) during the process, the error object error includes information about the reason for the failure. If the wrapping is successfully performed, then the success callback is called where the response object has the respective wrappedAddress in its arguments. This address may be used instead of the original NFT address when performing additional operations on the NFT.

CLAUSES

The technology disclosed can be practiced as a system, method, or article of manufacture. One or more features of an implementation can be combined with the base implementation. Implementations that are not mutually exclusive are taught to be combinable. One or more features of an implementation can be combined with other implementations. This disclosure periodically reminds the user of these options. Omission from some implementations of recitations that repeat these options should not be taken as limiting the combinations taught in the preceding sections—these recitations are hereby incorporated forward by reference into each of the following implementations.

One or more implementations and clauses of the technology disclosed or elements thereof can be implemented in the form of a computer product, including a non-transitory computer-readable storage medium with computer usable program code for performing the method steps indicated. Furthermore, one or more implementations and clauses of the technology disclosed or elements thereof can be implemented in the form of an apparatus including a memory and at least one processor that is coupled to the memory and operative to perform exemplary method steps. Yet further, in another aspect, one or more implementations and clauses of the technology disclosed or elements thereof can be implemented in the form of means for carrying out one or more of the method steps described herein; the means can include (i) hardware module(s), (ii) software module(s) executing on one or more hardware processors, or (iii) a combination of hardware and software modules; any of (i)-(iii) implement the specific techniques set forth herein, and the software modules are stored in a computer-readable storage medium (or multiple such media).

The clauses described in this section can be combined as features. In the interest of conciseness, the combinations of features are not individually enumerated and are not repeated with each base set of features. The reader will understand how features identified in the clauses described in this section can readily be combined with sets of base features identified as implementations in other sections of this application. These and other features, aspects, and advantages of the technology disclosed will become apparent from the following detailed description of illustrative implementations thereof, which is to be read in connection with the accompanying drawings. These clauses are not meant to be mutually exclusive, exhaustive, or restrictive; and the technology disclosed is not limited to these clauses but rather encompasses all possible combinations, modifications, and variations within the scope of the claimed technology and its equivalents.

Other implementations of the clauses described in this section can include a non-transitory computer-readable storage medium storing instructions executable by a processor to perform any of the clauses described in this section. Yet another implementation of the clauses described in this section can include a system including memory and one or more processors operable to execute instructions, stored in the memory, to perform any of the clauses described in this section.

We disclose the following clauses:

Clause Set 1—Provenance for Repurposing of Artist-Specific Assets Using Non-Fungible Tokens (NFTs)

1. A provenance system for tracing repurposing of targeted artificial intelligence systems, comprising:

memory storing a training dataset that satisfies a target artist configuration by requiring that at least some training samples in the training dataset are sourced from a target artist, wherein the target artist configuration characterizes a work of the target artist;

training logic, having access to the memory, and configured to train an artificial intelligence system on the training dataset, and to generate a trained version of the artificial intelligence system, wherein the trained version of the artificial intelligence system is configured to construct an output that satisfies that target artist configuration;

deployment logic configured to make available the trained version of the artificial intelligence system via a blockchain network; and provenance logic configured to provide access to the trained version of the artificial intelligence system, and to validate that new outputs generated by repurposing the trained version of the artificial intelligence system satisfy the target artist configuration.

2. The provenance system of clause 1, wherein the provenance logic is further configured to assign a parent non-fungible token (NFT) to the trained version of the artificial intelligence system.

3. The provenance system of clause 2, wherein the parent NFT is configured to be traced back from offspring NFTs that are assigned to downstream results of the repurposing.

4. The provenance system of clause 3, wherein the downstream results of the repurposing are digital assets generated using the trained version of the artificial intelligence system.

5. The provenance system of clause 3, wherein the downstream results of the repurposing are digital assets generated using further trained versions of the trained version of the artificial intelligence system.

6. The provenance system of clause 1, wherein the repurposing of the trained version of the artificial intelligence system further comprises processing a new input through the trained version of the artificial intelligence system, and generating a new output that applies the target artist configuration to the new input.

7. The provenance system of clause 6, wherein the new input is a new image, and the new output is a reconstructed version of the new image overlayed with the target artist configuration.

8. The provenance system of clause 1, wherein the repurposing of the trained version of the artificial intelligence system further comprises further training the trained version of the artificial intelligence system on a further training dataset that satisfies a further target configuration, and generating a further trained version of the artificial intelligence system, wherein the further trained version of the artificial intelligence system is configured to construct an output that satisfies a combination of the target artist configuration and the further target configuration.

9. The provenance system of clause 8, wherein the repurposing of the trained version of the artificial intelligence system further comprises processing a new input through the further trained version of the artificial intelligence system, and generating a new output that applies the combination of the target artist configuration and the further target configuration to the new input.

10. The provenance system of clause 8, wherein the further training dataset requires that at least some training samples in the further training dataset are sourced from a further target artist, wherein the further target configuration characterizes a work of the further target artist.

11. The provenance system of clause 9, wherein the further target configuration conditions generation of the new output on one or more user-supplied parameters.

12. The provenance system of clause 11, wherein the user-supplied parameters include a random seed.

13. The provenance system of clause 12, wherein the random seed is based on a Mandelbrot set.

14. The provenance system of clause 11, wherein the user-supplied parameters include a speech type.

15. The provenance system of clause 11, wherein the user-supplied parameters include an art type.

16. The provenance system of clause 11, wherein the user-supplied parameters include a current state of the blockchain network.

17. The provenance system of clause 16, wherein the current state of the blockchain network includes block hashes and surrounding blockchain nodes.

18. The provenance system of clause 1, further configured to comprise an internal repurposing logic that is configured to implement the repurposing.

19. The provenance system of clause 1, wherein the trained version of the artificial intelligence system is accessible by an external repurposing logic that is not part of the provenance system of clause 1.

20. The provenance system of clause 19, wherein the external repurposing logic is configured to implement the repurposing.

21. A computer-implemented method of tracing repurposing of targeted artificial intelligence systems, including:

storing a training dataset that satisfies a target artist configuration by requiring that at least some training samples in the training dataset are sourced from a target artist, wherein the target artist configuration characterizes a work of the target artist;

training an artificial intelligence system on the training dataset, and to generate a trained version of the artificial intelligence system, wherein the trained version of the artificial intelligence system is configured to construct an output that satisfies that target artist configuration;

deploying the trained version of the artificial intelligence system via a blockchain network;

providing access to the trained version of the artificial intelligence system; and validating that new outputs generated by repurposing the trained version of the artificial intelligence system satisfy the target artist configuration.

22. The computer-implemented method of clause 21, further including assigning a parent non-fungible token (NFT) to the trained version of the artificial intelligence system.

23. The computer-implemented method of clause 22, wherein the parent NFT is configured to be traced back from offspring NFTs that are assigned to downstream results of the repurposing.

24. The computer-implemented method of clause 23, wherein the downstream results of the repurposing are digital assets generated using the trained version of the artificial intelligence system.

25. The computer-implemented method of clause 23, wherein the downstream results of the repurposing are digital assets generated using further trained versions of the trained version of the artificial intelligence system.

26. The computer-implemented method of clause 21, wherein the repurposing of the trained version of the artificial intelligence system further including processing a new input through the trained version of the artificial intelligence system, and generating a new output that applies the target artist configuration to the new input.

27. The computer-implemented method of clause 26, wherein the new input is a new image, and the new output is a reconstructed version of the new image overlayed with the target artist configuration.

28. The computer-implemented method of clause 21, wherein the repurposing of the trained version of the artificial intelligence system further comprises further training the trained version of the artificial intelligence system on a further training dataset that satisfies a further target configuration, and generating a further trained version of the artificial intelligence system, wherein the further trained version of the artificial intelligence system is configured to construct an output that satisfies a combination of the target artist configuration and the further target configuration.

29. The computer-implemented method of clause 28, wherein the repurposing of the trained version of the artificial intelligence system further including processing a new input through the further trained version of the artificial intelligence system, and generating a new output that applies the combination of the target artist configuration and the further target configuration to the new input.

30. The computer-implemented method of clause 28, wherein the further training dataset requires that at least some training samples in the further training dataset are sourced from a further target artist, wherein the further target configuration characterizes a work of the further target artist.

31. The computer-implemented method of clause 29, wherein the further target configuration conditions generation of the new output on one or more user-supplied parameters.

32. The computer-implemented method of clause 31, wherein the user-supplied parameters include a random seed.

33. The computer-implemented method of clause 32, wherein the random seed is based on a Mandelbrot set.

34. The computer-implemented method of clause 31, wherein the user-supplied parameters include a speech type.

35. The computer-implemented method of clause 31, wherein the user-supplied parameters include an art type.

36. The computer-implemented method of clause 31, wherein the user-supplied parameters include a current state of the blockchain network.

37. The computer-implemented method of clause 36, wherein the current state of the blockchain network includes block hashes and surrounding blockchain nodes.

38. A non-transitory computer-readable storage medium impressed with computer program instructions to provide provenance of tracing repurposing of targeted artificial intelligence systems, the instructions, when executed on a processor, implement a method comprising:

storing a training dataset that satisfies a target artist configuration by requiring that at least some training samples in the training dataset are sourced from a target artist, wherein the target artist configuration characterizes a work of the target artist;

training an artificial intelligence system on the training dataset, and to generate a trained version of the artificial intelligence system, wherein the trained version of the artificial intelligence system is configured to construct an output that satisfies that target artist configuration;

deploying the trained version of the artificial intelligence system via a blockchain network;

providing access to the trained version of the artificial intelligence system; and validating that new outputs generated by a repurposed trained version of the artificial intelligence system satisfy the target artist configuration.

39. The non-transitory computer-readable storage medium of clause 38, further including assigning a parent non-fungible token (NFT) to the trained version of the artificial intelligence system.

40. The non-transitory computer-readable storage medium of clause 39, wherein the parent NFT is configured to be traced back from offspring NFTs that are assigned to downstream results of the repurposing.

41. The non-transitory computer-readable storage medium of clause 40, wherein the downstream results of the repurposing are digital assets generated using the trained version of the artificial intelligence system.

42. The non-transitory computer-readable storage medium of clause 40, wherein the downstream results of the repurposing are digital assets generated using further trained versions of the trained version of the artificial intelligence system.

43. The non-transitory computer-readable storage medium of clause 38, wherein the repurposing of the trained version of the artificial intelligence system further including processing a new input through the trained version of the artificial intelligence system, and generating a new output that applies the target artist configuration to the new input.

44. The non-transitory computer-readable storage medium of clause 43, wherein the new input is a new image, and the new output is a reconstructed version of the new image overlaid with the target artist configuration.

45. The non-transitory computer-readable storage medium of clause 38, wherein the repurposing of the trained version of the artificial intelligence system further comprises further training the trained version of the artificial intelligence system on a further training dataset that satisfies a further target configuration, and generating a further trained version of the artificial intelligence system, wherein the further trained version of the artificial intelligence system is configured to construct an output that satisfies a combination of the target artist configuration and the further target configuration.

46. The non-transitory computer-readable storage medium of clause 45, wherein the repurposing of the trained version of the artificial intelligence system further including processing a new input through the further trained version of the artificial intelligence system, and generating a new output that applies the combination of the target artist configuration and the further target configuration to the new input.

47. The non-transitory computer-readable storage medium of clause 45, wherein the further training dataset requires that at least some training samples in the further training dataset are sourced from a further target artist, wherein the further target configuration characterizes a work of the further target artist.

48. The non-transitory computer-readable storage medium of clause 46, wherein the further target configuration conditions generation of the new output on one or more user-supplied parameters.

49. The non-transitory computer-readable storage medium of clause 41, wherein the user-supplied parameters include a random seed.

50. The non-transitory computer-readable storage medium of clause 49, wherein the random seed is based on a Mandelbrot set.

51. The non-transitory computer-readable storage medium of clause 48, wherein the user-supplied parameters include a speech type.

52. The non-transitory computer-readable storage medium of clause 48, wherein the user-supplied parameters include an art type.

53. The non-transitory computer-readable storage medium of clause 48, wherein the user-supplied parameters include a current state of the blockchain network.

54. The non-transitory computer-readable storage medium of clause 53, wherein the current state of the blockchain network includes block hashes and surrounding blockchain nodes.

Clause Set 2—Provenance for Licensing of Artist-Specific Assets Using Non-Fungible Tokens (NFTs)

1. A provenance system for tracing licensing of targeted artificial intelligence systems, comprising:

memory storing a training dataset that satisfies a target artist configuration by requiring that at least some training samples in the training dataset are sourced from a target artist, wherein the target artist configuration characterizes a work of the target artist;

training logic, having access to the memory, and configured to train an artificial intelligence system on the training dataset, and to generate a trained version of the artificial intelligence system, wherein the trained version of the artificial intelligence system is configured to construct an output that satisfies that target artist configuration;

deployment logic configured to make available the trained version of the artificial intelligence system on a blockchain network; and provenance logic configured to license the trained version of the artificial intelligence system to a plurality of licensees, and to validate that licensed copies of the trained version of the artificial intelligence system satisfy the target artist configuration.

2. The provenance system of clause 1, wherein the provenance logic is further configured to assign a parent non-fungible token (NFT) to the trained version of the artificial intelligence system.

3. The provenance system of clause 2, wherein the parent NFT is configured to be traced back from offspring NFTs that are assigned to the licensed copies of the trained version of the artificial intelligence system.

4. The provenance system of clause 2, wherein the provenance logic is further configured to validate that downstream results of the licensed copies of the trained version of the artificial intelligence system satisfy the target artist configuration.

5. The provenance system of clause 4, wherein the parent NFT is configured to be traced back from offspring NFTs that are assigned to the downstream results.

6. The provenance system of clause 5, wherein the downstream results are digital assets generated using the licensed copies of the trained version of the artificial intelligence system.

7. The provenance system of clause 6, wherein the downstream results are generated by processing new inputs through the licensed copies of the trained version of the artificial intelligence system, and generating new outputs that apply the target artist configuration to the new input.

8. The provenance system of clause 7, wherein the new inputs are new images, and the new outputs are reconstructed versions of the new images overlaid with the target artist configuration.

9. The provenance system of clause 5, wherein the downstream results are digital assets generated using further trained versions of the licensed copies of the trained version of the artificial intelligence system.

10. The provenance system of clause 9, wherein the downstream results are generated by further training the licensed copies of the trained versions of the artificial intelligence system on a further training dataset that satisfies a further target configuration, and generating further trained versions of the artificial intelligence system, wherein the further trained versions of the artificial intelligence system are configured to construct outputs that satisfy a combination of the target artist configuration and the further target configuration.

11. The provenance system of clause 10, wherein the downstream results are generated by new inputs through the further trained versions of the artificial intelligence system, and generating new outputs that apply the combination of the target artist configuration and the further target configuration to the new inputs.

12. The provenance system of clause 11, wherein the further training dataset requires that at least some training samples in the further training dataset are sourced from a further target artist, wherein the further target configuration characterizes a work of the further target artist.

13. The provenance system of clause 12, wherein the further target configuration conditions generation of the new outputs on one or more user-supplied parameters.

14. The provenance system of clause 13, wherein the user-supplied parameters include a random seed.

15. The provenance system of clause 14, wherein the random seed is based on a Mandelbrot set.

16. The provenance system of clause 13, wherein the user-supplied parameters include a speech type.

17. The provenance system of clause 13, wherein the user-supplied parameters include an art type.

18. The provenance system of clause 13, wherein the user-supplied parameters include a current state of the blockchain network.

19. The provenance system of clause 18, wherein the current state of the blockchain network includes block hashes and surrounding blockchain nodes.

20. The provenance system of clause 1, wherein the licensed copies of the trained version of the artificial intelligence system are used to generate the downstream results in the provenance system of clause 1.

21. The provenance system of clause 1, wherein the licensed copies of the trained version of the artificial intelligence system are used to generate the downstream results outside the provenance system of clause 1.

22. A computer-implemented method of tracing licensing of targeted artificial intelligence systems, including:

storing a training dataset that satisfies a target artist configuration by requiring that at least some training samples in the training dataset are sourced from a target artist, wherein the target artist configuration characterizes a work of the target artist;

training an artificial intelligence system on the training dataset, and generating a trained version of the artificial intelligence system, wherein the trained version of the artificial intelligence system is configured to construct an output that satisfies that target artist configuration;

deploying the trained version of the artificial intelligence system via a blockchain network;

licensing the trained version of the artificial intelligence system to a plurality of licensees; and validating that licensed copies of the trained version of the artificial intelligence system satisfy the target artist configuration.

23. The computer-implemented method of clause 22, further including assigning a parent non-fungible token (NFT) to the trained version of the artificial intelligence system.

24. The computer-implemented method of clause 23, wherein the parent NFT is configured to be traced back from offspring NFTs that are assigned to the licensed copies of the trained version of the artificial intelligence system.

25. The computer-implemented method of clause 23, further including validating that downstream results of the licensed copies of the trained version of the artificial intelligence system satisfy the target artist configuration.

26. The computer-implemented method of clause 25, wherein the parent NFT is configured to be traced back from offspring NFTs that are assigned to the downstream results.

27. The computer-implemented method of clause 26, wherein the downstream results are digital assets generated using the licensed copies of the trained version of the artificial intelligence system.

28. The computer-implemented method of clause 27, wherein the downstream results are generated by processing new inputs through the licensed copies of the trained version of the artificial intelligence system, and generating new outputs that apply the target artist configuration to the new input.

29. The computer-implemented method of clause 28, wherein the new inputs are new images, and the new outputs are reconstructed versions of the new images overlaid with the target artist configuration.

30. The computer-implemented method of clause 26, wherein the downstream results are digital assets generated using further trained versions of the licensed copies of the trained version of the artificial intelligence system.

31. The computer-implemented method of clause 30, wherein the downstream results are generated by further training the licensed copies of the trained versions of the artificial intelligence system on a further training dataset that satisfies a further target configuration, and generating further trained versions of the artificial intelligence system, wherein the further trained versions of the artificial intelligence system are configured to construct outputs that satisfy a combination of the target artist configuration and the further target configuration.

32. The computer-implemented method of clause 31, wherein the downstream results are generated by new inputs through the further trained versions of the artificial intelligence system, and generating new outputs that apply the combination of the target artist configuration and the further target configuration to the new inputs.

33. The computer-implemented method of clause 32, wherein the further training dataset requires that at least some training samples in the further training dataset are sourced from a further target artist, wherein the further target configuration characterizes a work of the further target artist.

34. The computer-implemented method of clause 33, wherein the further target configuration conditions generation of the new outputs on one or more user-supplied parameters.

35. The computer-implemented method of clause 34, wherein the user-supplied parameters include a random seed.

36. The computer-implemented method of clause 35, wherein the random seed is based on a Mandelbrot set.

37. The computer-implemented method of clause 34, wherein the user-supplied parameters include a speech type.

38. The computer-implemented method of clause 34, wherein the user-supplied parameters include an art type.

39. The computer-implemented method of clause 34, wherein the user-supplied parameters include a current state of the blockchain network.

40. The computer-implemented method of clause 39, wherein the current state of the blockchain network includes block hashes and surrounding blockchain nodes.

41. A non-transitory computer-readable storage medium impressed with computer program instructions to trace licensing of targeted artificial intelligence systems, the instructions, when executed on a processor, implement a method comprising:

storing a training dataset that satisfies a target artist configuration by requiring that at least some training samples in the training dataset are sourced from a target artist, wherein the target artist configuration characterizes a work of the target artist;

training an artificial intelligence system on the training dataset, and generating a trained version of the artificial intelligence system, wherein the trained version of the artificial intelligence system is configured to construct an output that satisfies that target artist configuration;

deploying the trained version of the artificial intelligence system via a blockchain network;

licensing the trained version of the artificial intelligence system to a plurality of licensees; and validating that licensed copies of the trained version of the artificial intelligence system satisfy the target artist configuration.

42. The non-transitory computer-readable storage medium of clause 41, further including assigning a parent non-fungible token (NFT) to the trained version of the artificial intelligence system.

43. The non-transitory computer-readable storage medium of clause 42, wherein the parent NFT is configured to be traced back from offspring NFTs that are assigned to the licensed copies of the trained version of the artificial intelligence system.

44. The non-transitory computer-readable storage medium of clause 42, further including validating that downstream results of the licensed copies of the trained version of the artificial intelligence system satisfy the target artist configuration.

45. The non-transitory computer-readable storage medium of clause 44, wherein the parent NFT is configured to be traced back from offspring NFTs that are assigned to the downstream results.

46. The non-transitory computer-readable storage medium of clause 45, wherein the downstream results are digital assets generated using the licensed copies of the trained version of the artificial intelligence system.

47. The non-transitory computer-readable storage medium of clause 46, wherein the downstream results are generated by processing new inputs through the licensed copies of the trained version of the artificial intelligence system, and generating new outputs that apply the target artist configuration to the new input.

48. The non-transitory computer-readable storage medium of clause 47, wherein the new inputs are new images, and the new outputs are reconstructed versions of the new images overlaid with the target artist configuration.

49. The non-transitory computer-readable storage medium of clause 45, wherein the downstream results are digital assets generated using further trained versions of the licensed copies of the trained version of the artificial intelligence system.

50. The non-transitory computer-readable storage medium of clause 49, wherein the downstream results are generated by further training the licensed copies of the trained versions of the artificial intelligence system on a further training dataset that satisfies a further target configuration, and generating further trained versions of the artificial intelligence system, wherein the further trained versions of the artificial intelligence system are configured to construct outputs that satisfy a combination of the target artist configuration and the further target configuration.

51. The non-transitory computer-readable storage medium of clause 50, wherein the downstream results are generated by new inputs through the further trained versions of the artificial intelligence system, and generating new outputs that apply the combination of the target artist configuration and the further target configuration to the new inputs.

52. The non-transitory computer-readable storage medium of clause 51, wherein the further training dataset requires that at least some training samples in the further training dataset are sourced from a further target artist, wherein the further target configuration characterizes a work of the further target artist.

53. The non-transitory computer-readable storage medium of clause 52, wherein the further target configuration conditions generation of the new outputs on one or more user-supplied parameters.

54. The non-transitory computer-readable storage medium of clause 53, wherein the user-supplied parameters include a random seed.

55. The non-transitory computer-readable storage medium of clause 54, wherein the random seed is based on a Mandelbrot set.

56. The non-transitory computer-readable storage medium of clause 53, wherein the user-supplied parameters include a speech type.

57. The non-transitory computer-readable storage medium of clause 53, wherein the user-supplied parameters include an art type.

58. The non-transitory computer-readable storage medium of clause 53, wherein the user-supplied parameters include a current state of the blockchain network.

59. The non-transitory computer-readable storage medium of clause 58, wherein the current state of the blockchain network includes block hashes and surrounding blockchain nodes.

Clause Set 3—Fractional Ownership of Artificial Intelligence Assets Using Non-Fungible Tokens (NFTs) and Credit Flow Therefor 1. A fractional ownership system for artificial intelligence systems, comprising:

memory storing an artificial intelligence system;

fractionalization logic configured to specify respective fractions of ownership for respective owners of the artificial intelligence system, wherein the fractions of ownership are specified based on a plurality of architectural resolutions of an architecture of the artificial intelligence system; and credit flow logic configured to fractionalize and allocate credit results from licensing of the artificial intelligence system to the respective owners based on the fractions of ownership.

2. The fractional ownership system of clause 1, wherein the fractionalization logic is further configured to assign a parent non-fungible token (NFT) to the artificial intelligence system.

3. The fractional ownership system of clause 2, wherein the parent NFT is linked to respective offspring NFTs that correspond to the respective fractions of ownership for the respective owners of the artificial intelligence system.

4. The fractional ownership system of clause 3, wherein the credit flow logic is further configured to fractionalize and allocate the credit using the offspring NFTs.

5. The fractional ownership system of clause 1, wherein the plurality of architectural resolutions of the architecture of the artificial intelligence system includes a layer-by-layer resolution for layers in the artificial intelligence system.

6. The fractional ownership system of clause 5, wherein the artificial intelligence system has n layers that are owned by m owners, thereby generating m fractions of ownership, where n>m.

7. The fractional ownership system of clause 1, wherein the plurality of architectural resolutions of the architecture of the artificial intelligence system includes a weight subset-by-weight subset resolution for a weight set in a layer in the artificial intelligence system.

8. The fractional ownership system of clause 7, wherein the artificial intelligence system has i weight subsets across j layers, wherein the i weight subsets are owned by k owners, thereby generating k fractions of ownership, where i>j>k.

9. The fractional ownership system of clause 1, wherein the credit flow logic is implemented using a smart contract.

10. The fractional ownership system of clause 1, wherein the fractionalized credit is allocated to respective digital wallets of the respective owners.

11. A computer-implemented method of fractional ownership of artificial intelligence systems, including:

storing an artificial intelligence system;

specifying respective fractions of ownership for respective owners of the artificial intelligence system, wherein the fractions of ownership are specified based on a plurality of architectural resolutions of an architecture of the artificial intelligence system; and fractionalizing and allocating credit results from licensing of the artificial intelligence system to the respective owners based on the fractions of ownership.

12. The computer-implemented method of clause 11, further including assigning a parent non-fungible token (NFT) to the artificial intelligence system.

13. The computer-implemented method of clause 12, wherein the parent NFT is linked to respective offspring NFTs that correspond to the respective fractions of ownership for the respective owners of the artificial intelligence system.

14. The computer-implemented method of clause 13, further including fractionalizing and allocating the credit using the offspring NFTs.

15. The computer-implemented method of clause 11, wherein the plurality of architectural resolutions of the architecture of the artificial intelligence system includes a layer-by-layer resolution for layers in the artificial intelligence system.

16. The computer-implemented method of clause 15, wherein the artificial intelligence system has n layers that are owned by m owners, thereby generating m fractions of ownership, where n>m.

17. The computer-implemented method of clause 11, wherein the plurality of architectural resolutions of the architecture of the artificial intelligence system includes a weight subset-by-weight subset resolution for a weight set in a layer in the artificial intelligence system.

18. The computer-implemented method of clause 17, wherein the artificial intelligence system has i weight subsets across j layers, wherein the i weight subsets are owned by k owners, thereby generating k fractions of ownership, where i>j>k.

19. The computer-implemented method of clause 11, further including implementing the fractionalization and the allocation of the credit using a smart contract.

20. The computer-implemented method of clause 11, wherein the fractionalized credit is allocated to respective digital wallets of the respective owners.

21. A non-transitory computer-readable storage medium impressed with computer program instructions to implement fractional ownership of artificial intelligence systems, the instructions, when executed on a processor, implement a method comprising:

storing an artificial intelligence system;

specifying respective fractions of ownership for respective owners of the artificial intelligence system, wherein the fractions of ownership are specified based on a plurality of architectural resolutions of an architecture of the artificial intelligence system; and fractionalizing and allocating credit results from licensing of the artificial intelligence system to the respective owners based on the fractions of ownership.

22. The non-transitory computer-readable storage medium of clause 21, implementing the method further comprising assigning a parent non-fungible token (NFT) to the artificial intelligence system.

23. The non-transitory computer-readable storage medium of clause 22, wherein the parent NFT is linked to respective offspring NFTs that correspond to the respective fractions of ownership for the respective owners of the artificial intelligence system.

24. The non-transitory computer-readable storage medium of clause 23, implementing the method further comprising fractionalizing and allocating the credit using the offspring NFTs.

25. The non-transitory computer-readable storage medium of clause 21, wherein the plurality of architectural resolutions of the architecture of the artificial intelligence system includes a layer-by-layer resolution for layers in the artificial intelligence system.

26. The non-transitory computer-readable storage medium of clause 25, wherein the artificial intelligence system has n layers that are owned by m owners, thereby generating m fractions of ownership, where n>m.

27. The non-transitory computer-readable storage medium of clause 21, wherein the plurality of architectural resolutions of the architecture of the artificial intelligence system includes a weight subset-by-weight subset resolution for a weight set in a layer in the artificial intelligence system.

28. The non-transitory computer-readable storage medium of clause 27, wherein the artificial intelligence system has i weight subsets across j layers, wherein the i weight subsets are owned by k owners, thereby generating k fractions of ownership, where i>j>k.

29. The non-transitory computer-readable storage medium of clause 21, implementing the method further comprising implementing the fractionalization and the allocation of the credit using a smart contract.

30. The non-transitory computer-readable storage medium of clause 21, wherein the fractionalized credit is allocated to respective digital wallets of the respective owners.

Clause Set 4—Identity Designations ("AKAs") for Metaverse Environments

1. A system, comprising:

metaverse environment configured to render a plurality of digital avatars;

memory storing a plurality of identity labels ("akas"), identity labels in the plurality of identity labels configured for designation to digital avatars in the plurality of digital avatars;

identity designation logic configured to designate an identity label from the plurality of identity labels to an avatar in the plurality of avatars in response to a user selection of the identity label; and rendering logic configured to render the avatar in the metaverse environment with the designated identity label.

2. The system of claim 1, wherein the digital avatars are computer-generated imagery (CGI).

3. The system of claim 1, wherein the identity labels are CGI.

4. The system of claim 1, wherein the designation of the identity label to the avatar results in a modified graphical rendering of the avatar.

5. The system of claim 4, wherein the modified graphical rendering of the avatar renders one or more themes corresponding to the identity label.

6. The system of claim 5, wherein the themes are names of characters from popular culture.

7. The system of claim 6, wherein the themes are depictions of the characters.

8. A computer-implemented method, including:

rendering a plurality of digital avatars;

storing a plurality of identity labels ("akas"), identity labels in the plurality of identity labels configured for designation to digital avatars in the plurality of digital avatars;

designating an identity label from the plurality of identity labels to an avatar in the plurality of avatars in response to a user selection of the identity label; and rendering the avatar in the metaverse environment with the designated identity label.

9. The computer-implemented method of claim 8, wherein the digital avatars are computer-generated imagery (CGI).

10. The computer-implemented method of claim 8, wherein the identity labels are CGI.

11. The computer-implemented method of claim 8, wherein the designation of the identity label to the avatar results in a modified graphical rendering of the avatar.

12. The computer-implemented method of claim 11, wherein the modified graphical rendering of the avatar renders one or more themes corresponding to the identity label.

13. The computer-implemented method of claim 12, wherein the themes are names of characters from popular culture.

14. The computer-implemented method of claim 13, wherein the themes are depictions of the characters.

15. A non-transitory computer-readable storage medium impressed with computer program instructions to implement fractional ownership of artificial intelligence systems, the instructions, when executed on a processor, implement a method comprising:

rendering a plurality of digital avatars;

storing a plurality of identity labels ("akas"), identity labels in the plurality of identity labels configured for designation to digital avatars in the plurality of digital avatars;

designating an identity label from the plurality of identity labels to an avatar in the plurality of avatars in response to a user selection of the identity label; and rendering the avatar in the metaverse environment with the designated identity label.

16. The non-transitory computer-readable storage medium of claim 15, wherein the digital avatars are computer-generated imagery (CGI).

17. The non-transitory computer-readable storage medium of claim 15, wherein the identity labels are CGI.

18. The non-transitory computer-readable storage medium of claim 15, wherein the designation of the identity label to the avatar results in a modified graphical rendering of the avatar.

19. The non-transitory computer-readable storage medium of claim 18, wherein the modified graphical rendering of the avatar renders one or more themes corresponding to the identity label.

20. The non-transitory computer-readable storage medium of claim 19, wherein the themes are names of characters from popular culture.

While the present invention is disclosed by reference to the preferred implementations and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following clauses.

The technology disclosed can be applied to the following domains:

Metaverse: In metaverse, collectors can own a virtual land, and build virtual galleries or buildings. They can create their character and trade cloth, accessories, or different shapes of eyes, noses, mouths, and wearables to decorate characters. Decentraland, The Sandbox, and Cryptovoxels are the most representative virtual world. As a virtual space, access is possible without restrictions of place and time. Thus, metaverse can be used as a venue for a community meeting.

Utility: Utility is used in a wide variety of projects on multipurpose. The utility would use cases in domain names, music, tickets, and assets that allow the owner to access specific rights. ENS: Ethereum Name Service, for instance. 'These domains are secure domain names for the decentralized world. ENS domains provide a way for users to map human-readable names to blockchain and non-blockchain resources, like Ethereum addresses, IPFS hashes, or website URLs.

Gaming: In a game segment, NFT is used to register ownership of game items and characters on a blockchain system so that collectors can trade and earn cryptocurrency. Thus, P2E (play to earn) emerges as a game-changer in a game ecosystem. Collectors (players) can profit by trading or selling their gaming assets while playing P2E games. Another significant NFT in the gaming field is that collectors can still own their gaming assets even a gaming project stop operating. Many NFT games include Gods Unchained, Axie Infinity, and Zed Run.

Sport: In sport, NFT is used to record short clips of historical highlight scenes, such as LeBron dunk shoot highlight. Like Rob Gronkowski Championship Series NFTs.

What is claimed is:

1. A provenance system for tracing licensing of targeted artificial intelligence systems, comprising:

memory storing a training dataset that satisfies a target artist configuration by requiring that at least some training samples in the training dataset are sourced from a target artist, wherein the target artist configuration characterizes a work of the target artist;

training logic, having access to the memory, and configured to train an artificial intelligence system on the training dataset, and to generate a trained version of the artificial intelligence system, wherein the trained version of the artificial intelligence system is configured to construct an output that satisfies that target artist configuration;

deployment logic configured to make available the trained version of the artificial intelligence system; and provenance logic configured to license the trained version of the artificial intelligence system to a plurality of licensees, and to validate that licensed copies of the trained version of the artificial intelligence system satisfy the target artist configuration, wherein the provenance logic comprises a creator's list, wherein the creator's list is configured to authenticate new outputs generated by the trained version of the artificial intelligence system, and wherein the creator's list is further configured to authenticate the new outputs based on a provenance wrapper that includes a provenance vault that is accessible by a provenance private key.

2. The provenance system of claim 1, wherein the creator's list is further configured to authenticate that the trained version of the artificial intelligence system is the target artist's brain.

3. The provenance system of claim 2, wherein the creator's list is further configured to authenticate that the trained version of the artificial intelligence system was trained on the training dataset comprising the training samples that represent the target artist's authenticated work.

4. The provenance system of claim 3, wherein the creator's list is further configured to authenticate that the target artist is authorized the use of his or her work as training data for training the trained version of the artificial intelligence system.

5. The provenance system of claim 1, wherein the provenance logic is further configured to validate that downstream results of the licensed copies of the trained version of the artificial intelligence system satisfy the target artist configuration.

6. The provenance system of claim 5, wherein the downstream results are digital assets generated using the licensed copies of the trained version of the artificial intelligence system.

7. The provenance system of claim 6, wherein the downstream results are generated by processing new inputs through the licensed copies of the trained version of the artificial intelligence system, and generating new outputs that apply the target artist configuration to the new input.

8. The provenance system of claim 7, wherein the new inputs are new songs, and the new outputs are reconstructed versions of the new songs overlaid with the target artist configuration.

9. The provenance system of claim 5, wherein the downstream results are digital assets generated using further trained versions of the licensed copies of the trained version of the artificial intelligence system.

10. The provenance system of claim 9, wherein the downstream results are generated by further training the licensed copies of the trained versions of the artificial intelligence system on a further training dataset that satisfies a further target configuration, and generating further trained versions of the artificial intelligence system, wherein the further trained versions of the artificial intelligence system are configured to construct outputs that satisfy a combination of the target artist configuration and the further target configuration.

11. The provenance system of claim 10, wherein the downstream results are generated by new inputs through the further trained versions of the artificial intelligence system, and generating new outputs that apply the combination of the target artist configuration and the further target configuration to the new inputs.

12. The provenance system of claim 11, wherein the further training dataset requires that at least some training samples in the further training dataset are sourced from a further target artist, wherein the further target configuration characterizes a work of the further target artist.

13. The provenance system of claim 12, wherein the further target configuration conditions generation of the new outputs on one or more user-supplied parameters.

14. The provenance system of claim 13, wherein the user-supplied parameters include a random seed.

15. The provenance system of claim 14, wherein the random seed is based on a Mandelbrot set.

16. The provenance system of claim 13, wherein the user-supplied parameters include a speech type.

17. The provenance system of claim 13, wherein the user-supplied parameters include an art type.

18. The provenance system of claim 13, wherein the user-supplied parameters include a current state of a blockchain network.

19. The provenance system of claim 1, wherein the licensed copies of the trained version of the artificial intelligence system are used to generate the downstream results.

20. The provenance system of claim 1, wherein the licensed copies of the trained version of the artificial intelligence system are used to generate the downstream results.

* * * * *